United States Patent
Ji et al.

(10) Patent No.: US 12,055,681 B2
(45) Date of Patent: Aug. 6, 2024

(54) OPTICAL IMAGING LENS GROUP

(71) Applicant: ZHEJIANG SUNNY OPTICS CO., LTD., Yuyao Zhejiang (CN)

(72) Inventors: Yunbing Ji, Yuyao Zhejiang (CN); Xin Zhou, Yuyao Zhejiang (CN); Yu Tang, Yuyao Zhejiang (CN)

(73) Assignee: ZHEJIANG SUNNY OPTICS CO., LTD., Yuyao Zhejiang (CN)

( * ) Notice: Subject to any disclaimer, the term of this patent is extended or adjusted under 35 U.S.C. 154(b) by 745 days.

(21) Appl. No.: 17/123,663

(22) Filed: Dec. 16, 2020

(65) Prior Publication Data

US 2021/0103129 A1  Apr. 8, 2021

Related U.S. Application Data

(63) Continuation of application No. PCT/CN2019/102144, filed on Aug. 23, 2019.

(30) Foreign Application Priority Data

Nov. 27, 2018 (CN) .......................... 201811424454.6

(51) Int. Cl.
 *G02B 13/00* (2006.01)
 *G02B 9/64* (2006.01)
(52) U.S. Cl.
 CPC ........... *G02B 13/0045* (2013.01); *G02B 9/64* (2013.01)
(58) Field of Classification Search
 CPC ............................. G02B 9/64; G02B 13/0045
 (Continued)

(56) References Cited

U.S. PATENT DOCUMENTS

| 10,571,661 B2 | 2/2020 | Huang |
| 10,725,269 B2 | 7/2020 | Hsieh et al. |

(Continued)

FOREIGN PATENT DOCUMENTS

| CN | 103558677 A | 2/2014 |
| CN | 104932086 A | 9/2015 |

(Continued)

OTHER PUBLICATIONS

English Translation of International Search Report mailed Sep. 30, 2019, in connection with PCT International Application No. PCT/CN2019/102144.
International Search Report mailed Sep. 30, 2019, in connection with PCT International Application No. PCT/CN2019/102144.
(Continued)

*Primary Examiner* — Nicholas R. Pasko
(74) *Attorney, Agent, or Firm* — Norris McLaughlin, P.A.

(57) ABSTRACT

The present disclosure discloses an optical imaging lens group including, sequentially from an object side to an image side along an optical axis, a first lens, a second lens, a third lens, a fourth lens, a fifth lens, a sixth lens, a seventh lens and an eighth lens. The first lens has positive refractive power, a convex object-side surface and a concave image-side surface; the second lens has negative refractive power and a concave image-side surface; the third lens has positive refractive power and a convex object-side surface; the fourth lens has refractive power; the fifth lens has refractive power; the sixth lens has refractive power, a convex object-side surface and a concave image-side surface; the seventh lens has positive refractive power; and the eighth lens has refractive power. A total effective focal length f and an entrance pupil diameter EPD satisfy f/EPD<1.4.

20 Claims, 18 Drawing Sheets

(58) Field of Classification Search
USPC ......................................................... 359/713
See application file for complete search history.

(56) References Cited

U.S. PATENT DOCUMENTS

| | | | |
|---|---|---|---|
| 11,493,733 B2* | 11/2022 | Xu | ............................ G02B 9/64 |
| 11,506,867 B2 | 11/2022 | Huang | |
| 11,662,555 B2* | 5/2023 | Ye | ............................ G02B 9/64 |
| | | | 359/754 |
| 11,971,523 B2 | 4/2024 | Li et al. | |
| 2008/0252996 A1 | 10/2008 | Kato | |
| 2017/0045714 A1* | 2/2017 | Huang | ............... G02B 13/0045 |
| 2019/0056568 A1* | 2/2019 | Huang | ..................... G02B 9/64 |
| 2019/0101729 A1* | 4/2019 | Hsieh | ................ G02B 13/0045 |
| 2019/0391365 A1* | 12/2019 | Son | ................... G02B 13/0045 |
| 2020/0393648 A1* | 12/2020 | Lin | .................... G02B 13/0045 |
| 2021/0018728 A1 | 1/2021 | Li et al. | |
| 2021/0018729 A1 | 1/2021 | Li et al. | |

FOREIGN PATENT DOCUMENTS

| | | |
|---|---|---|
| CN | 107643586 A | 1/2018 |
| CN | 107741630 A | 2/2018 |
| CN | 207424361 U | 5/2018 |
| CN | 207424362 U | 5/2018 |
| CN | 108107545 A | 6/2018 |
| CN | 207557562 U | 6/2018 |
| CN | 108445610 A | 8/2018 |
| CN | 108681040 A | 10/2018 |
| CN | 108873272 A | 11/2018 |
| CN | 109343203 A | 2/2019 |
| CN | 209215716 U | 8/2019 |
| TW | I636279 B | 9/2018 |
| TW | I636279 B | 4/2019 |

OTHER PUBLICATIONS

Written Opinion issued in connection with PCT International Application No. PCT/CN2019/102144.

* cited by examiner

OPTICAL IMAGING LENS GROUP

CROSS-REFERENCE TO RELATED APPLICATION

The present patent application is a continuation of International Application No. PCT/CN2019/102144, filed on Aug. 23, 2019, which claims priority to Chinese Patent Application No. 201811424454.6, filed before the China National Intellectual Property Administration (CNIPA) on Nov. 27, 2018. All of the aforementioned patent applications are hereby incorporated by reference in their entireties.

TECHNICAL FIELD

The present disclosure relates to an optical imaging lens group, and more specifically, relates to an optical imaging lens group including eight lenses.

BACKGROUND

At present, in order to meet the requirements of multiple application scenarios, different types of optical imaging lens groups have gradually appeared on the market. For example, the telephoto optical lens group is suitable for long-distance imaging, the ultra-thin optical lens group is suitable for ultra-thin mobile phone bodies, the ultra-wide-angle optical lens group is suitable for wide-angle imaging and is used in ball screen projection, vehicle security, etc., and the large-aperture optical lens group is suitable for clear imaging in low light conditions. The large-aperture optical imaging lens group has the following advantages: it helps to clear imaging in dim light; and it helps to obtain a small depth of field to achieve a shooting effect with a large aperture background blur. These advantages make the large-aperture optical imaging lens group more popular in the field of mobile phone camera.

Due to the large aperture of the large-aperture imaging lens group, the lens aperture and the total length of the lens group tend to be relatively large. Conventional systems using spherical lenses are difficult to achieve large-aperture imaging while ensuring a small lens aperture and short total lens group length. Therefore, how to improve the imaging clarity of the large-aperture imaging lens group while satisfying the miniaturization of the system is one of the most important issues in this field.

SUMMARY

The present disclosure provides an optical imaging lens group that is applicable to portable electronic products and at least solves or partially solves at least one of the above disadvantages of the prior art.

In one aspect, the present disclosure provides an optical imaging lens group which includes, sequentially from an object side to an image side along an optical axis, a first lens, a second lens, a third lens, a fourth lens, a fifth lens, a sixth lens, a seventh lens and an eighth lens. The first lens may have positive refractive power, an object-side surface thereof may be convex, and an image-side surface thereof may be concave; the second lens may have negative refractive power, and an image-side surface thereof may be concave; the third lens may have positive refractive power, and an object-side surface thereof may be convex; the fourth lens has positive or negative refractive power; the fifth lens has positive or negative refractive power; the sixth lens has positive or negative refractive power, an object-side surface thereof may be convex, and an image-side surface thereof may be concave; the seventh lens may have positive refractive power; and the eighth lens has positive or negative refractive power.

In one embodiment, a total effective focal length f of the optical imaging lens group and an entrance pupil diameter EPD of the optical imaging lens group may satisfy f/EPD<1.4.

In one embodiment, an effective focal length f1 of the first lens and half of a diagonal length ImgH of an effective pixel area on an imaging plane of the optical imaging lens group may satisfy 1<f1/ImgH<2.

In one embodiment, a radius of curvature R1 of the object-side surface of the first lens and a radius of curvature R2 of the image-side surface of the first lens may satisfy 0.1<R1/R2<0.5.

In one embodiment, an effective focal length f2 of the second lens and an effective focal length f3 of the third lens may satisfy −1.5<f2/f3<−0.5.

In one embodiment, a distance TTL along the optical axis from the object-side surface of the first lens to an imaging plane of the optical imaging lens group and a radius of curvature R5 of the object-side surface of the third lens may satisfy 1<TTL/R5<3.

In one embodiment, a radius of curvature R11 of the object-side surface of the sixth lens and a radius of curvature R12 of the image-side surface of the sixth lens may satisfy 1<R11/R12<1.5.

In one embodiment, a center thickness CT1 of the first lens along the optical axis, a center thickness CT4 of the fourth lens along the optical axis and a center thickness CT5 of the fifth lens along the optical axis may satisfy 1<CT1/(CT4+CT5)<2.

In one embodiment, a center thickness CT7 of the seventh lens along the optical axis and a center thickness CT8 of the eighth lens along the optical axis may satisfy 1<CT7/CT8<2.

In one embodiment, a combined focal length f123 of the first lens, the second lens and the third lens and a combined focal length f456 of the fourth lens, the fifth lens and the sixth lens may satisfy −4<f456/f123<−1.5.

In one embodiment, a sum of center thicknesses ΣCT of the first lens to the eighth lens along the optical axis and a sum of spaced intervals ΣAT along the optical axis between each two adjacent lenses of the first lens to the eighth lens may satisfy 2<ΣCT/ΣAT<2.5.

The present disclosure employs eight lenses, and the optical imaging lens group has at least one beneficial effect, such as large aperture, miniaturization and high image quality and the like, by rationally configuring the refractive power, the surface shape, the center thickness of each lens, and the on-axis spaced interval between the lenses and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
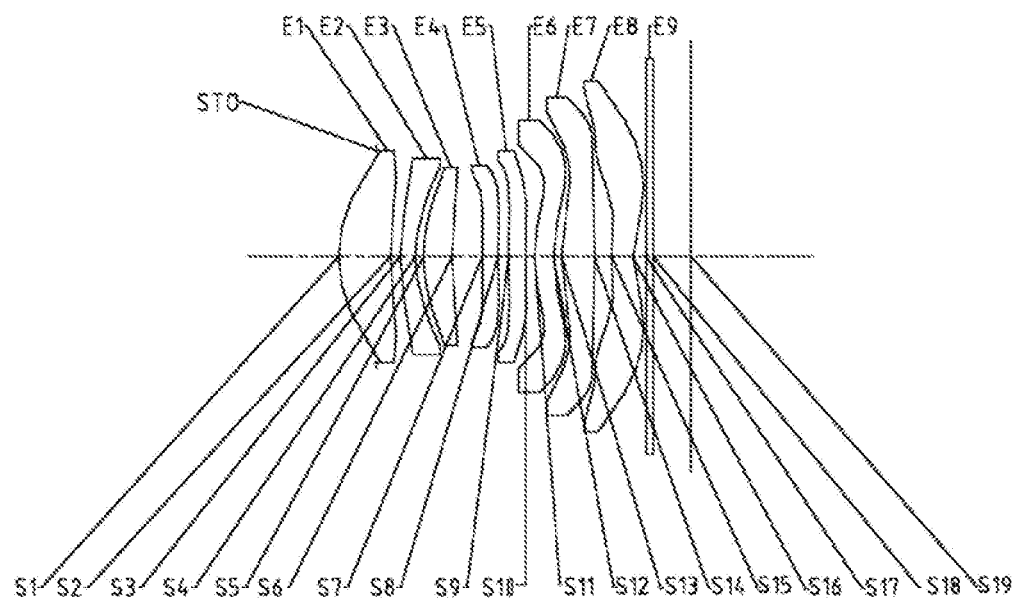
FIG. 1 illustrates a schematic structural view of an optical imaging lens group according to example 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial area refers to an area near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the imaging plane is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the examples in the present disclosure and the features in the examples may be combined with each other on a non-conflict basis. The present disclosure will be described in detail below with reference to the accompanying drawings and in combination with the examples. The features, principles, and other aspects of the present disclosure are described in detail below.

An optical imaging lens group according to an exemplary embodiment of the present disclosure may include, for example, eight lenses having refractive power, which are a first lens, a second lens, a third lens, a fourth lens, a fifth lens, a sixth lens, a seventh lens and an eighth lens. The eight lenses are arranged sequentially from an object side to an image side along an optical axis. Among the first lens to the eighth lens, there may be an air interval between each two adjacent lenses.

In an exemplary embodiment, the first lens may have positive refractive power, an object-side surface thereof may be convex, and an image-side surface thereof may be concave; the second lens may have negative refractive power, and an image-side surface thereof may be concave; the third lens may have positive refractive power, and an object-side surface thereof may be convex; the fourth lens has positive or negative refractive power; the fifth lens has positive or negative refractive power; the sixth lens has positive or negative refractive power, an object-side surface thereof may be convex, and an image-side surface thereof may be concave; the seventh lens may have positive refractive power; and the eighth lens has positive or negative refractive power.

In an exemplary embodiment, an image-side surface of the fifth lens may be concave.

In an exemplary embodiment, an object-side surface of the seventh lens may be convex.

In an exemplary embodiment, an image-side surface of the eighth lens may be concave.

In an exemplary embodiment, the optical imaging lens group according to the present disclosure may satisfy: $f/EPD<1.4$, where f is a total effective focal length of the optical imaging lens group, and EPD is an entrance pupil diameter of the optical imaging lens group. More specifically, f and EPD may further satisfy: $1.1<f/EPD<1.4$, for example, $1.29 \leq f/EPD \leq 1.36$. Satisfying the conditional expression $f/EPD<1.4$ is conducive to realizing large-aperture imaging to facilitate clear imaging under low-light conditions.

In an exemplary embodiment, the optical imaging lens group according to the present disclosure may satisfy: $1<f1/ImgH<2$, where f1 is an effective focal length of the first lens, and ImgH is half of a diagonal length of an effective pixel area on an imaging plane of the optical imaging lens group. More specifically, f1 and ImgH may further satisfy: $1.3<f1/ImgH<1.9$, for example, $1.45 \leq f1/ImgH \leq 1.86$. When the conditional expression $1<f1/ImgH<2$ is satisfied, the image height may be effectively prevented from being too small, which is beneficial to matching the chip. At the same time, it is beneficial to improve the chromatic aberration and distortion of the system.

In an exemplary embodiment, the optical imaging lens group according to the present disclosure may satisfy: $-1.5<f2/f3<-0.5$, where f2 is an effective focal length of the second lens, and f3 is an effective focal length of the third lens. More specifically, f2 and f3 may further satisfy: $-1.33 \leq f2/f3 \leq -0.88$. By reasonably assigning the refractive power of the second lens and the third lens, it is beneficial to compensate the chromatic aberration and effectively reduce the total length of the system. Meanwhile, it is beneficial to enlarge the aperture.

In an exemplary embodiment, the optical imaging lens group according to the present disclosure may satisfy: $0.1<R1/R2<0.5$, where R1 is a radius of curvature of the object-side surface of the first lens, and R2 is a radius of curvature of the image-side surface of the first lens. More specifically, R1 and R2 may further satisfy: $0.17 \leq R1/R2 \leq 0.43$. When the conditional expression $0.1<R1/R2<0.5$ is satisfied, the first lens may be effectively prevented from being too curved, which is beneficial to controlling the edge thickness of the first lens and reducing the processing difficulty. At the same time, it is beneficial to improve the chromatic aberration of the optical imaging lens group.

In an exemplary embodiment, the optical imaging lens group according to the present disclosure may satisfy: $1<TTL/R5<3$, where TTL is a distance along the optical axis from the object-side surface of the first lens to an imaging plane of the optical imaging lens group, and R5 is a radius of curvature of the object-side surface of the third lens. More specifically, TTL and R5 may further satisfy: $1.1<TTL/R5<2.7$, for example, $1.25 \leq TTL/R5 \leq 2.54$. Satisfying the conditional expression $1<TTL/R5<3$ may effectively prevent the third lens from being too curved, which is beneficial to reducing the difficulty of processing. At the same time, it is beneficial to reasonably control the total length of the system.

In an exemplary embodiment, the optical imaging lens group according to the present disclosure may satisfy: $-4<f456/f123<-1.5$, where f123 is a combined focal length of the first lens, the second lens and the third lens, and f456 is a combined focal length of the fourth lens, the fifth lens and the sixth lens. More specifically, f456 and f123 may further satisfy: $-3.70 \leq f456/f123 \leq -1.95$. When the conditional expression $-4<f456/f123<-1.5$ is satisfied, the first, second, and third lenses assume the main refractive power, and cooperate with the fourth, fifth and sixth lenses to compensate the chromatic aberration of the lens group, thereby improving the picture clarity.

In an exemplary embodiment, the optical imaging lens group according to the present disclosure may satisfy: $1<R11/R12<1.5$, where R11 is a radius of curvature of the object-side surface of the sixth lens, and R12 is a radius of curvature of the image-side surface of the sixth lens. More specifically, R11 and R12 may further satisfy: $1.03 \leq R11/R12 \leq 1.37$. Satisfying the conditional expression $1<R11/R12<1.5$ may effectively prevent the sixth lens from being too curved, which is beneficial to reducing the processing difficulty and effectively controlling the chromatic aberration and field curvature of the system.

In an exemplary embodiment, the optical imaging lens group according to the present disclosure may satisfy: $2<\Sigma CT/\Sigma AT<2.5$, where $\Sigma CT$ is a sum of center thicknesses of the first lens to the eighth lens along the optical axis, and $\Sigma AT$ is a sum of spaced intervals along the optical axis between each two adjacent lenses of the first lens to the eighth lens. More specifically, $\Sigma CT$ and $\Sigma AT$ may further satisfy: $2.01 \leq \Sigma CT/\Sigma AT \leq 2.34$. When the conditional expression $2<\Sigma CT/\Sigma AT<2.5$ is satisfied, it is beneficial to control the air interval between adjacent lenses and the total length of the system, thereby reducing the difficulty of processing and assembly. At the same time, it is beneficial to provide sufficient space between adjacent lenses so that the surface of each lens has a higher degree of freedom to change, so as to improve the ability of the optical imaging lens group to correct astigmatic and field curvature.

In an exemplary embodiment, the optical imaging lens group according to the present disclosure may satisfy: $1<CT1/(CT4+CT5)<2$, where CT1 is a center thickness of the first lens along the optical axis, CT4 is a center thickness of the fourth lens along the optical axis, and CT5 is a center thickness of the fifth lens along the optical axis. More specifically, CT1, CT4 and CT5 may further satisfy: $1.3<CT1/(CT4+CT5)<1.7$, for example, $1.42 \leq CT1/(CT4+CT5) \leq 1.58$. Satisfying the conditional expression $1<CT1/(CT4+CT5)<2$ may effectively prevent the center thicknesses of the fourth lens and the fifth lens from being too thin, thereby reducing the difficulty of processing and assembly.

In an exemplary embodiment, the optical imaging lens group according to the present disclosure may satisfy: $1<CT7/CT8<2$, where CT7 is a center thickness of the seventh lens along the optical axis, and CT8 is a center thickness of the eighth lens along the optical axis. More specifically, CT7 and CT8 may further satisfy: $1.10 \leq CT7/CT8 \leq 1.60$. Satisfying the conditional expression $1<CT7/CT8<2$ may effectively avoid the excessive difference in the center thickness of the seventh lens and the eighth lens, thereby reducing the difficulty of assembly and ensuring the shape of the lens's surface. At the same time, it may effectively correct the field curvature.

In an exemplary embodiment, the above optical imaging lens group may further include a stop to improve the image quality of the optical imaging lens group. Optionally, the stop may be disposed between the object side and the first lens. Optionally, the above optical imaging lens group may further include an optical filter for correcting the color deviation and/or a protective glass for protecting the photosensitive element located on an imaging plane.

The optical imaging lens group according to the above embodiments of the present disclosure may employ a plurality of lenses, such as eight lenses as described above. By properly configuring the refractive power of each lens, the surface shape, the center thickness of each lens, and spaced intervals along the optical axis between the lenses, the size and the sensitivity of the optical imaging lens group may be effectively reduced, and the workability of the optical imaging lens group may be improved, such that the optical imaging lens group is more advantageous for production processing and may be applied to portable electronic products. The optical imaging lens group configured as described above may also have beneficial effects such as large aperture, miniaturization, high image quality, and the like.

In the embodiments of the present disclosure, at least one of the surfaces of the lenses is aspheric, that is, at least one of the object-side surface and the image-side surface of each of the first lens, the second lens, the third lens, the fourth lens, the fifth lens, the sixth lens, the seventh lens and the eighth lens is aspheric. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the image quality. Optionally, the object-side surface and the image-side surface of each of the first lens, the second lens, the third lens, the fourth lens, the fifth lens, the sixth lens, the seventh lens and the eighth lens are aspheric.

However, it will be understood by those skilled in the art that the number of lenses constituting the optical imaging lens group may be varied to achieve the various results and advantages described in this specification without departing from the technical solution claimed by the present disclosure. For example, although the embodiment is described by taking eight lenses as an example, the optical imaging lens group is not limited to include eight lenses. The optical imaging lens group may also include other numbers of lenses if desired.

Some specific examples of an optical imaging lens group applicable to the above embodiment will be further described below with reference to the accompanying drawings.

EXAMPLE 1

An optical imaging lens group according to example 1 of the present disclosure is described below with reference to FIG. 1 to FIG. 2D. FIG. 1 shows a schematic structural view of the optical imaging lens group according to example 1 of the present disclosure.

As shown in FIG. 1, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 1 shows surface type, radius of curvature, thickness, material and conic coefficient of each lens of the optical imaging lens group in example 1, wherein the units for the radius of curvature and the thickness are millimeter (mm).

TABLE 1

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5960 | | | |
| S1 | Aspheric | 2.1671 | 0.8200 | 1.55 | 64.1 | −0.6496 |
| S2 | Aspheric | 5.6223 | 0.1499 | | | −38.9687 |
| S3 | Aspheric | 2.7771 | 0.2400 | 1.67 | 20.4 | −40.3487 |
| S4 | Aspheric | 1.8011 | 0.1337 | | | −5.3677 |
| S5 | Aspheric | 2.4771 | 0.4500 | 1.55 | 64.1 | −1.9340 |
| S6 | Aspheric | 6.5909 | 0.4725 | | | 16.3962 |
| S7 | Aspheric | 16.6604 | 0.2600 | 1.67 | 20.4 | 99.0000 |
| S8 | Aspheric | 14.8550 | 0.1638 | | | 82.0679 |
| S9 | Aspheric | 14.5515 | 0.2700 | 1.67 | 20.4 | 80.2987 |
| S10 | Aspheric | 8.7498 | 0.1396 | | | 11.8186 |
| S11 | Aspheric | 2.7131 | 0.3000 | 1.66 | 21.5 | −10.6945 |
| S12 | Aspheric | 2.2016 | 0.1253 | | | −15.6319 |
| S13 | Aspheric | 2.6543 | 0.5204 | 1.55 | 64.1 | −1.7110 |
| S14 | Aspheric | −19.5864 | 0.2741 | | | −99.0000 |
| S15 | Aspheric | 2.2844 | 0.3375 | 1.55 | 64.1 | −14.7042 |
| S16 | Aspheric | 1.1531 | 0.2082 | | | −5.8941 |
| S17 | Spherical | Infinite | 0.1100 | 1.52 | 64.1 | |
| S18 | Spherical | Infinite | 0.5977 | | | |
| S19 | Spherical | Infinite | | | | |

As can be seen from table 1, the object-side surface and the image-side surface of any one of the first lens E1 to the eighth lens E8 are aspheric. In this example, the surface shape x of each aspheric lens may be defined by using, but not limited to, the following aspheric formula:

$$x = \frac{ch^2}{1 + \sqrt{1 - (k+1)c^2h^2}} + \Sigma A_i h^i \quad (1)$$

Where, x is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient (given in the above Table 1); Ai is a correction coefficient for the i-th order of the aspheric surface. Table 2 below shows high-order coefficients A4, A6, A8, A10, A12, A14, A16, A18 and A20 applicable to each aspheric surface S1 to S16 in example 1.

Table 3 shows half of a diagonal length ImgH of an effective pixel area on the imaging plane S19 of the optical imaging lens group, a total optical length TTL (i.e., a distance from the object-side surface S1 of the first lens E1 to the imaging plane S19 along the optical axis), half of a maximal field-of-view HFOV, a total effective focal length f of the optical imaging lens group, and effective focal lengths f1 to f8 of respective lens in example 1.

TABLE 3

| ImgH (mm) | 3.39 | f3 (mm) | 6.99 |
|---|---|---|---|
| TTL (mm) | 5.57 | f4 (mm) | −217.72 |
| HFOV (°) | 37.0 | f5 (mm) | −33.47 |
| f (mm) | 4.33 | f6 (mm) | −23.15 |
| f1 (mm) | 5.95 | f7 (mm) | 4.31 |
| f2 (mm) | −8.51 | f8 (mm) | −4.76 |

Figure 2A:
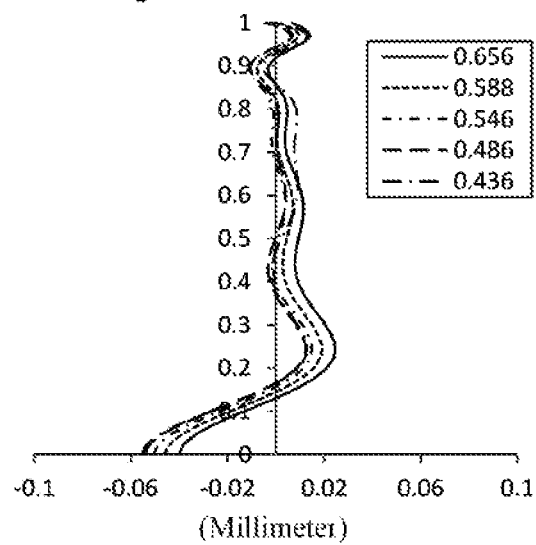
FIGS. 2A to 2D illustrate a longitudinal aberration curve, an astigmatic curve, a distortion curve, and a lateral color curve of the optical imaging lens group of the example 1, respectively.

FIG. 2A illustrates a longitudinal aberration curve of the optical imaging lens group according to example 1, representing deviations of focal points converged by light of different wavelengths after passing through the lens group.

TABLE 2

| Surface number | A4 | A6 | A8 | A10 | A12 | A14 | A16 | A18 | A20 |
|---|---|---|---|---|---|---|---|---|---|
| S1 | 6.4213E−03 | 1.3008E−05 | 4.9128E−03 | −1.1643E−02 | 1.2153E−02 | −7.1909E−03 | 2.4294E−03 | −4.4729E−04 | 3.4511E−05 |
| S2 | 8.7774E−03 | 6.0202E−05 | −1.4444E−02 | 3.7880E−03 | 6.7258E−03 | −6.4756E−03 | 2.5516E−03 | −4.9383E−04 | 3.8333E−05 |
| S3 | 8.2777E−02 | −1.4593E−01 | 1.1608E−01 | −4.8453E−02 | −6.4647E−03 | 2.2134E−02 | −1.2207E−02 | 2.9648E−03 | −2.7660E−04 |
| S4 | −4.5920E−02 | 1.8425E−01 | −3.8022E−01 | 4.7485E−01 | −3.9404E−01 | 2.1713E−01 | −7.6536E−02 | 1.6056E−02 | −1.5577E−03 |
| S5 | −4.5613E−02 | 1.1863E−01 | −1.8279E−01 | 1.4368E−01 | −1.5877E−02 | −7.6996E−02 | 6.4142E−02 | −2.0368E−02 | 2.3409E−03 |
| S6 | −1.6257E−02 | −2.5846E−02 | 1.0555E−01 | −2.3869E−01 | 3.2170E−01 | −2.7175E−01 | 1.3603E−01 | −3.6411E−02 | 4.0230E−03 |
| S7 | −3.7018E−02 | 4.5791E−02 | −1.9573E−01 | 3.1769E−01 | −3.1358E−01 | 1.9246E−01 | −7.3196E−02 | 1.6157E−02 | −1.5973E−03 |
| S8 | −9.6537E−03 | −5.2163E−02 | 1.0348E−01 | −2.1140E−01 | 2.6831E−01 | −2.1297E−01 | 1.0077E−01 | −2.5852E−02 | 2.7712E−03 |
| S9 | 1.7457E−02 | −2.5042E−01 | 5.4739E−01 | −6.7786E−01 | 5.2336E−01 | −2.5577E−01 | 7.4187E−02 | −1.0966E−02 | 5.4193E−04 |
| S10 | 7.6114E−02 | −5.6227E−01 | 1.0385E+00 | −1.1546E+00 | 8.3546E−01 | −3.9389E−01 | 1.1588E−01 | −1.9167E−02 | 1.3530E−03 |
| S11 | 1.3308E−01 | −3.6404E−01 | 4.8443E−01 | −4.4906E−01 | 2.8234E−01 | −1.1804E−01 | 3.0576E−02 | −4.3299E−03 | 2.5230E−04 |
| S12 | 4.5861E−02 | −6.5508E−02 | 2.3305E−02 | 3.8136E−03 | −7.6739E−03 | 3.2392E−03 | −6.5542E−04 | 6.5224E−05 | −2.5319E−06 |
| S13 | −1.2458E−01 | 1.0231E−01 | −6.1589E−02 | 1.5137E−02 | 6.9705E−04 | −1.1648E−03 | 2.4519E−04 | −2.1296E−05 | 6.5420E−07 |
| S14 | −4.3902E−02 | 6.2003E−02 | −6.4948E−03 | −2.5110E−02 | 1.7034E−02 | −5.0966E−03 | 8.0487E−04 | −6.5313E−05 | 2.1493E−06 |
| S15 | −4.1670E−01 | 3.4042E−01 | −1.8074E−01 | 6.9873E−02 | −1.8300E−02 | 3.0534E−03 | −3.0880E−04 | 1.7270E−05 | −4.1101E−07 |
| S16 | −2.1132E−01 | 1.6242E−01 | −9.0004E−02 | 3.4499E−02 | −9.1240E−03 | 1.6204E−03 | −1.8187E−04 | 1.1511E−05 | −3.1048E−07 |

Figure 2B:
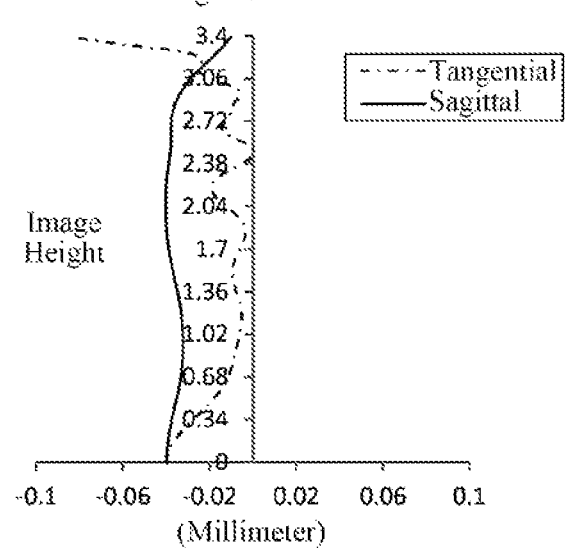
Figure 2C:
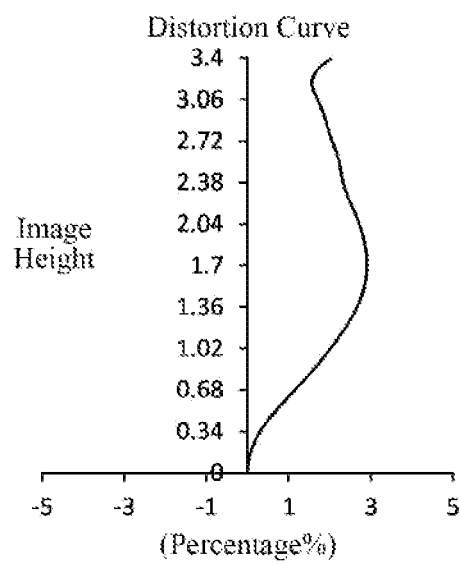
Figure 2D:
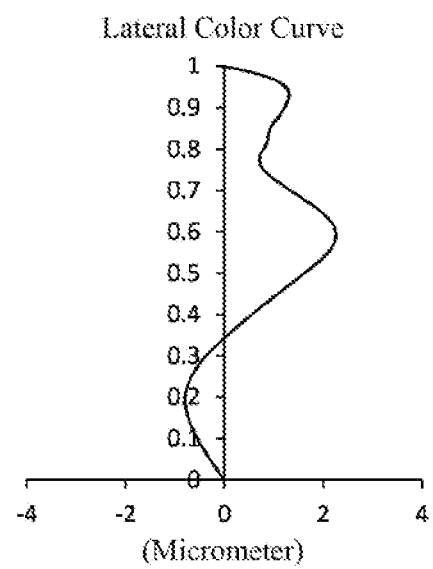

FIG. 2B illustrates an astigmatic curve of the optical imaging lens group according to example 1, representing a curvature of a tangential plane and a curvature of a sagittal plane. FIG. 2C illustrates a distortion curve of the optical imaging lens group according to example 1, representing amounts of distortion corresponding to different image heights. FIG. 2D illustrates a lateral color curve of the optical imaging lens group according to example 1, representing deviations of different image heights on an imaging plane after light passes through the lens group. It can be seen from FIG. 2A to FIG. 2D that the optical imaging lens group provided in example 1 may achieve good image quality.

EXAMPLE 2

Figure 3:
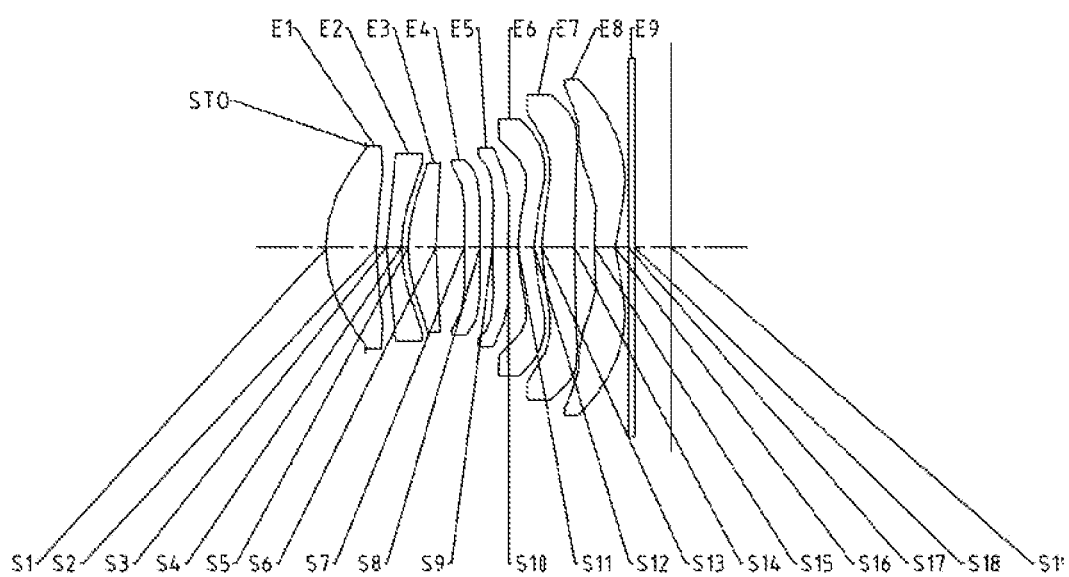
FIG. 3 illustrates a schematic structural view of an optical imaging lens group according to example 2 of the present disclosure.

An optical imaging lens group according to example 2 of the present disclosure is described below with reference to FIG. 3 to FIG. 4D. In this example and the following examples, for the purpose of brevity, the description of parts similar to those in example 1 will be omitted. FIG. 3 shows a schematic structural view of the optical imaging lens group according to example 2 of the present disclosure.

As shown in FIG. 3, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 4 shows surface type, radius of curvature, thickness, material and conic coefficient of each lens of the optical imaging lens group in example 2, wherein the units for the radius of curvature and the thickness are millimeter (mm). Table 5 shows high-order coefficients applicable to each aspheric surface in example 2, wherein the surface shape of each aspheric surface may be defined by the formula (1) given in the above example 1. Table 6 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 2.

TABLE 4

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.6500 | | | |
| S1 | Aspheric | 2.1677 | 0.8200 | 1.55 | 64.1 | −0.7422 |
| S2 | Aspheric | 5.1798 | 0.1659 | | | −40.2312 |
| S3 | Aspheric | 3.0739 | 0.2400 | 1.67 | 20.4 | −71.8317 |
| S4 | Aspheric | 1.8963 | 0.1125 | | | −6.3342 |
| S5 | Aspheric | 2.2648 | 0.4500 | 1.55 | 64.1 | −2.7537 |
| S6 | Aspheric | 6.2470 | 0.4605 | | | 6.6951 |
| S7 | Aspheric | 28.4000 | 0.2600 | 1.67 | 20.4 | 99.0000 |
| S8 | Aspheric | 29.8836 | 0.2049 | | | 86.1010 |
| S9 | Aspheric | 20.5563 | 0.2600 | 1.67 | 20.4 | 99.0000 |
| S10 | Aspheric | 9.4269 | 0.1504 | | | −82.8310 |
| S11 | Aspheric | 2.4795 | 0.2600 | 1.66 | 21.5 | −17.7809 |
| S12 | Aspheric | 2.1862 | 0.1238 | | | −17.6957 |
| S13 | Aspheric | 2.7275 | 0.5346 | 1.55 | 64.1 | −2.1788 |
| S14 | Aspheric | −167.0194 | 0.3235 | | | −99.0000 |
| S15 | Aspheric | 2.4979 | 0.3382 | 1.55 | 64.1 | −15.4914 |
| S16 | Aspheric | 1.2082 | 0.2112 | | | −6.0871 |
| S17 | Spherical | Infinite | 0.1100 | 1.52 | 64.1 | |
| S18 | Spherical | Infinite | 0.5874 | | | |
| S19 | Spherical | Infinite | | | | |

TABLE 5

| Surface number | A4 | A6 | A8 | A10 | A12 | A14 | A16 | A18 | A20 |
|---|---|---|---|---|---|---|---|---|---|
| S1 | 6.8034E−03 | 1.0075E−03 | 5.7613E−03 | −1.5765E−02 | 1.7623E−02 | −1.0867E−02 | 3.8034E−03 | −7.1392E−04 | 5.5321E−05 |
| S2 | 2.5749E−02 | −1.8294E−02 | −1.7042E−02 | 2.8250E−02 | −2.0808E−02 | 9.9251E−03 | −3.0881E−03 | 5.5631E−04 | −4.3482E−05 |

TABLE 5-continued

| Surface number | A4 | A6 | A8 | A10 | A12 | A14 | A16 | A18 | A20 |
|---|---|---|---|---|---|---|---|---|---|
| S3 | 1.4538E−01 | −3.2664E−01 | 4.2695E−01 | −4.2240E−01 | 3.0218E−01 | −1.4510E−01 | 4.3926E−02 | −7.5656E−03 | 5.6601E−04 |
| S4 | −4.2966E−02 | 2.1296E−01 | −5.3235E−01 | 7.8203E−01 | −7.6565E−01 | 5.0752E−01 | −2.1825E−01 | 5.4738E−02 | −6.0227E−03 |
| S5 | −6.0927E−02 | 2.0463E−01 | −4.5252E−01 | 6.8982E−01 | −7.4020E−01 | 5.3665E−01 | −2.5187E−01 | 6.9081E−02 | −8.2975E−03 |
| S6 | −2.3218E−02 | 1.6193E−02 | −3.1755E−02 | 6.2035E−02 | −1.0277E−01 | 1.0666E−01 | −6.8798E−02 | 2.4868E−02 | −3.7394E−03 |
| S7 | −3.0578E−02 | 4.5676E−03 | −1.3918E−01 | 3.4485E−01 | −4.8543E−01 | 4.1385E−01 | −2.1303E−01 | 6.1287E−02 | −7.5732E−03 |
| S8 | 1.4736E−02 | −1.6165E−01 | 3.5618E−01 | −5.6702E−01 | 5.8523E−01 | −3.9180E−01 | 1.6338E−01 | −3.8332E−02 | 3.8518E−03 |
| S9 | 1.8806E−02 | −1.9567E−01 | 4.0224E−01 | −4.8676E−01 | 3.7384E−01 | −1.8952E−01 | 6.0843E−02 | −1.1189E−02 | 9.0504E−04 |
| S10 | −2.6309E−03 | −2.2775E−01 | 3.7467E−01 | −3.4035E−01 | 1.8609E−01 | −5.9059E−02 | 8.3280E−03 | 3.6331E−04 | −1.7160E−04 |
| S11 | 9.6429E−02 | −2.1061E−01 | 1.7424E−01 | −8.0474E−02 | 5.4376E−03 | 1.2631E−02 | −6.3678E−03 | 1.3343E−03 | −1.0782E−04 |
| S12 | 9.4369E−02 | −2.1635E−01 | 2.3417E−01 | −1.6860E−01 | 7.9075E−02 | −2.3694E−02 | 4.3515E−03 | −4.4465E−04 | 1.9320E−05 |
| S13 | −3.4461E−02 | −7.4697E−02 | 1.1925E−01 | −9.6358E−02 | 4.4875E−02 | −1.2498E−02 | 2.0516E−03 | −1.8260E−04 | 6.7824E−06 |
| S14 | 1.4447E−02 | −2.0438E−02 | 3.7394E−02 | −3.2467E−02 | 1.4757E−02 | −3.7873E−03 | 5.5015E−04 | −4.2154E−05 | 1.3244E−06 |
| S15 | −3.6662E−01 | 2.5850E−01 | −1.1408E−01 | 3.8932E−02 | −9.5669E−03 | 1.5215E−03 | −1.4532E−04 | 7.5350E−06 | −1.6265E−07 |
| S16 | −1.9688E−01 | 1.3586E−01 | −6.7843E−02 | 2.4149E−02 | −6.0801E−03 | 1.0442E−03 | −1.1436E−04 | 7.0993E−06 | −1.8831E−07 |

TABLE 6

| ImgH (mm) | 3.39 | f3 (mm) | 6.25 |
|---|---|---|---|
| TTL (mm) | 5.61 | f4 (mm) | 800.00 |
| HFOV (°) | 36.5 | f5 (mm) | −26.31 |
| f (mm) | 4.36 | f6 (mm) | −43.37 |
| f1 (mm) | 6.22 | f7 (mm) | 4.91 |
| f2 (mm) | −8.07 | f8 (mm) | −4.72 |

Figure 4A:
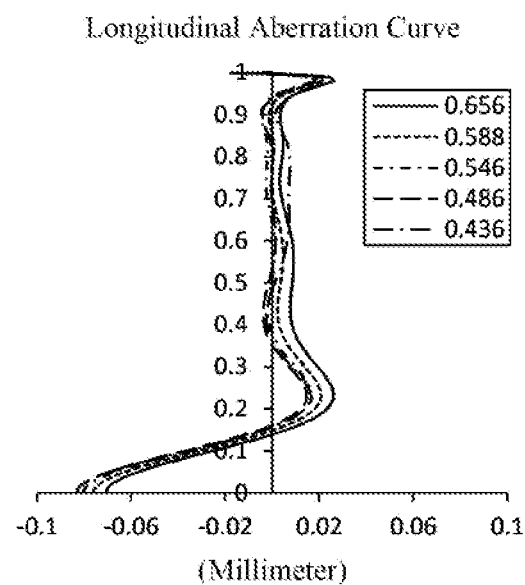
FIGS. 4A to 4D illustrate a longitudinal aberration curve, an astigmatic curve, a distortion curve, and a lateral color curve of the optical imaging lens group of the example 2, respectively.
Figure 4B:
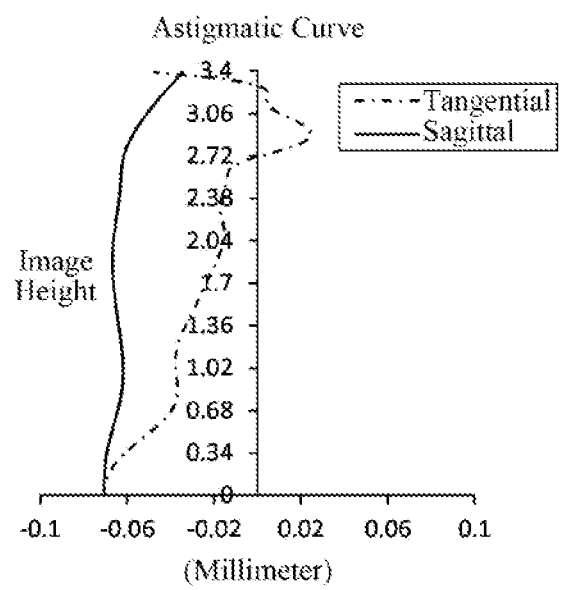
Figure 4C:
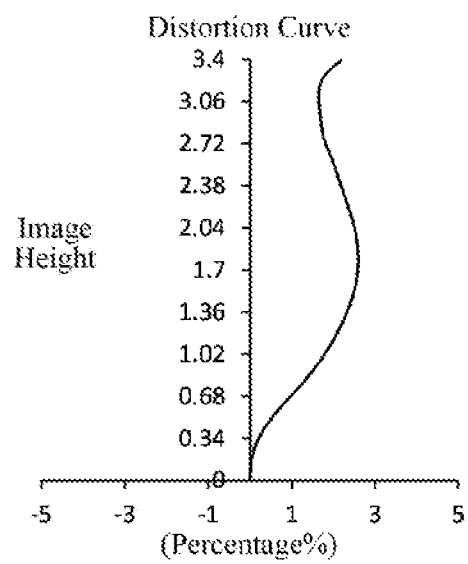
Figure 4D:
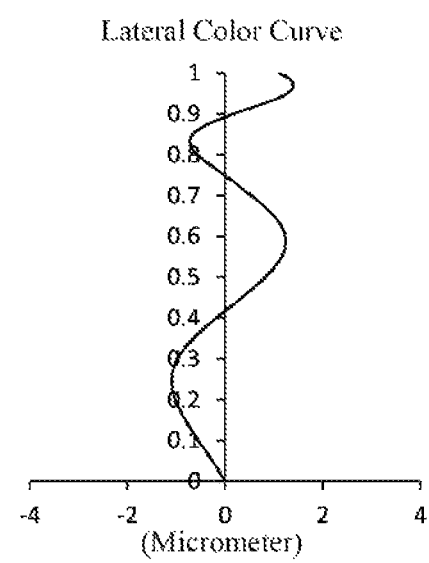

FIG. 4A illustrates a longitudinal aberration curve of the optical imaging lens group according to example 2, representing deviations of focal points converged by light of different wavelengths after passing through the lens group. FIG. 4B illustrates an astigmatic curve of the optical imaging lens group according to example 2, representing a curvature of a tangential plane and a curvature of a sagittal plane. FIG. 4C illustrates a distortion curve of the optical imaging lens group according to example 2, representing amounts of distortion corresponding to different image heights. FIG. 4D illustrates a lateral color curve of the optical imaging lens group according to example 2, representing deviations of different image heights on an imaging plane after light passes through the lens group. It can be seen from FIG. 4A to FIG. 4D that the optical imaging lens group provided in example 2 may achieve good image quality.

EXAMPLE 3

Figure 5:
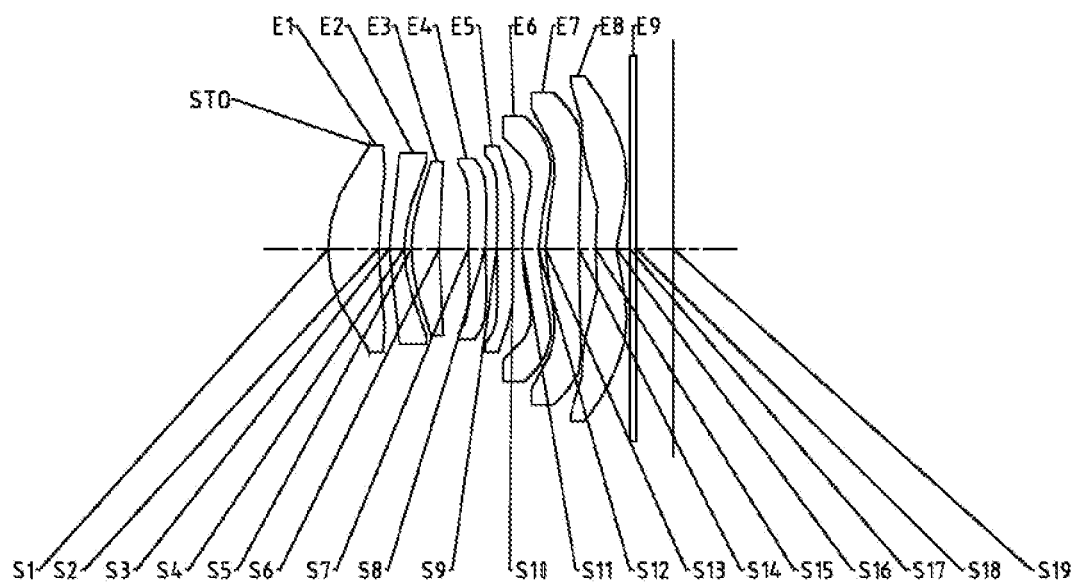
FIG. 5 illustrates a schematic structural view of an optical imaging lens group according to example 3 of the present disclosure.

An optical imaging lens group according to example 3 of the present disclosure is described below with reference to FIG. 5 to FIG. 6D. FIG. 5 shows a schematic structural view of the optical imaging lens group according to example 3 of the present disclosure.

As shown in FIG. 5, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has positive refractive power, an object-side surface S9 thereof is convex, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 7 shows surface type, radius of curvature, thickness, material and conic coefficient of each lens of the optical imaging lens group in example 3, wherein the units for the radius of curvature and the thickness are millimeter (mm). Table 8 shows high-order coefficients applicable to each aspheric surface in example 3, wherein the surface shape of each aspheric surface may be defined by the formula (1) given in the above example 1. Table 9 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 3.

TABLE 7

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.5960 | | | |
| S1 | Aspheric | 2.1837 | 0.8200 | 1.55 | 64.1 | −0.7575 |

TABLE 7-continued

| Surface number | Surface type | Radius of curvature | Thickness | Material Refractive index | Abbe number | Conic coefficient |
|---|---|---|---|---|---|---|
| S2 | Aspheric | 5.4788 | 0.1735 | | | −40.6538 |
| S3 | Aspheric | 2.9972 | 0.2400 | 1.67 | 20.4 | −53.4531 |
| S4 | Aspheric | 1.8704 | 0.1211 | | | −5.8677 |
| S5 | Aspheric | 2.3745 | 0.4500 | 1.55 | 64.1 | −2.5320 |
| S6 | Aspheric | 6.3809 | 0.4752 | | | 7.5796 |
| S7 | Aspheric | 12.2418 | 0.2777 | 1.67 | 20.4 | 42.4230 |
| S8 | Aspheric | 10.6351 | 0.1850 | | | 24.8862 |
| S9 | Aspheric | 15.5399 | 0.2600 | 1.67 | 20.4 | 97.6360 |
| S10 | Aspheric | 15.8979 | 0.1526 | | | 50.7172 |
| S11 | Aspheric | 2.8994 | 0.2654 | 1.66 | 21.5 | −13.5612 |
| S12 | Aspheric | 2.1216 | 0.1164 | | | −13.8215 |
| S13 | Aspheric | 2.4790 | 0.5400 | 1.55 | 64.1 | −2.5145 |
| S14 | Aspheric | −256.1456 | 0.2773 | | | 99.0000 |
| S15 | Aspheric | 2.1925 | 0.3375 | 1.55 | 64.1 | −14.6931 |
| S16 | Aspheric | 1.1532 | 0.2152 | | | −5.9096 |
| S17 | Spherical | Infinite | 0.1100 | 1.52 | 64.1 | |
| S18 | Spherical | Infinite | 0.5925 | | | |
| S19 | Spherical | Infinite | | | | |

TABLE 8

| Surface number | A4 | A6 | A8 | A10 | A12 | A14 | A16 | A18 | A20 |
|---|---|---|---|---|---|---|---|---|---|
| S1 | 9.9323E−03 | −1.0489E−02 | 3.0168E−02 | −4.6768E−02 | 4.2102E−02 | −2.2927E−02 | 7.3968E−03 | −1.3056E−03 | 9.6580E−05 |
| S2 | 1.9779E−02 | −1.5703E−02 | −2.6570E−04 | −2.5731E−03 | 6.3763E−03 | −4.4621E−03 | 1.5292E−03 | −2.6912E−04 | 1.9391E−05 |
| S3 | 1.0212E−01 | −1.9303E−01 | 1.8604E−01 | −1.2238E−01 | 4.7605E−02 | −4.0438E−03 | −4.3741E−03 | 1.6663E−03 | −1.8565E−04 |
| S4 | −4.8177E−02 | 2.2067E−01 | −5.1208E−01 | 7.1419E−01 | −6.5959E−01 | 4.0393E−01 | −1.5724E−01 | 3.5387E−02 | −3.5127E−03 |
| S5 | −5.4668E−02 | 1.7904E−01 | −3.8265E−01 | 5.4991E−01 | −5.3887E−01 | 3.4625E−01 | −1.4268E−01 | 3.5088E−02 | −3.9261E−03 |
| S6 | −1.9789E−02 | 8.5745E−04 | 2.4625E−02 | −7.9485E−02 | 1.1838E−01 | −1.0322E−01 | 4.9454E−02 | −1.1453E−02 | 9.2398E−04 |
| S7 | −4.0781E−02 | 4.0802E−02 | −1.6620E−01 | 2.7586E−01 | −2.9064E−01 | 1.9558E−01 | −8.3233E−02 | 2.0939E−02 | −2.4081E−03 |
| S8 | −1.5162E−02 | −6.3385E−02 | 1.7029E−01 | −3.2824E−01 | 3.8110E−01 | −2.7757E−01 | 1.2237E−01 | −2.9606E−02 | 3.0075E−03 |
| S9 | 2.7670E−02 | −2.8599E−01 | 6.3184E−01 | −8.1417E−01 | 6.7000E−01 | −3.5650E−01 | 1.1606E−01 | −2.0543E−02 | 1.4698E−03 |
| S10 | 1.0486E−01 | −6.0793E−01 | 1.1035E+00 | −1.2365E+00 | 9.1416E−01 | −4.4362E−01 | 1.3458E−01 | −2.2924E−02 | 1.6634E−03 |
| S11 | 1.6202E−01 | −4.2443E−01 | 5.4632E−01 | −4.8347E−01 | 2.9309E−01 | −1.2032E−01 | 3.1183E−02 | −4.4875E−03 | 2.6948E−04 |
| S12 | 7.3082E−02 | −1.4899E−01 | 1.2054E−01 | −5.6745E−02 | 1.4852E−02 | −1.9187E−03 | 5.1662E−05 | 1.2863E−05 | −9.6926E−07 |
| S13 | −8.6218E−02 | 4.7561E−02 | −2.4310E−02 | 9.7020E−04 | 3.8588E−03 | −1.5617E−03 | 2.6641E−04 | −2.0796E−05 | 5.7588E−07 |
| S14 | −2.3301E−02 | 5.2621E−02 | −1.7117E−02 | −1.2179E−02 | 1.0791E−02 | −3.4463E−03 | 5.5658E−04 | −4.5388E−05 | 1.4870E−06 |
| S15 | −3.8078E−01 | 2.8814E−01 | −1.3252E−01 | 4.4323E−02 | −1.0390E−02 | 1.5852E−03 | −1.4730E−04 | 7.5350E−06 | −1.6265E−07 |
| S16 | −2.0096E−01 | 1.4221E−01 | −7.0864E−02 | 2.4189E−02 | −5.7367E−03 | 9.3641E−04 | −9.9357E−05 | 6.0710E−06 | −1.5996E−07 |

TABLE 9

| | | | |
|---|---|---|---|
| ImgH (mm) | 3.39 | f3 (mm) | 6.65 |
| TTL (mm) | 5.61 | f4 (mm) | −130.29 |
| HFOV (°) | 36.7 | f5 (mm) | 800.00 |
| f (mm) | 4.36 | f6 (mm) | −13.91 |
| f1 (mm) | 6.11 | f7 (mm) | 4.50 |
| f2 (mm) | −8.14 | f8 (mm) | −5.03 |

Figures 6A, 6B:
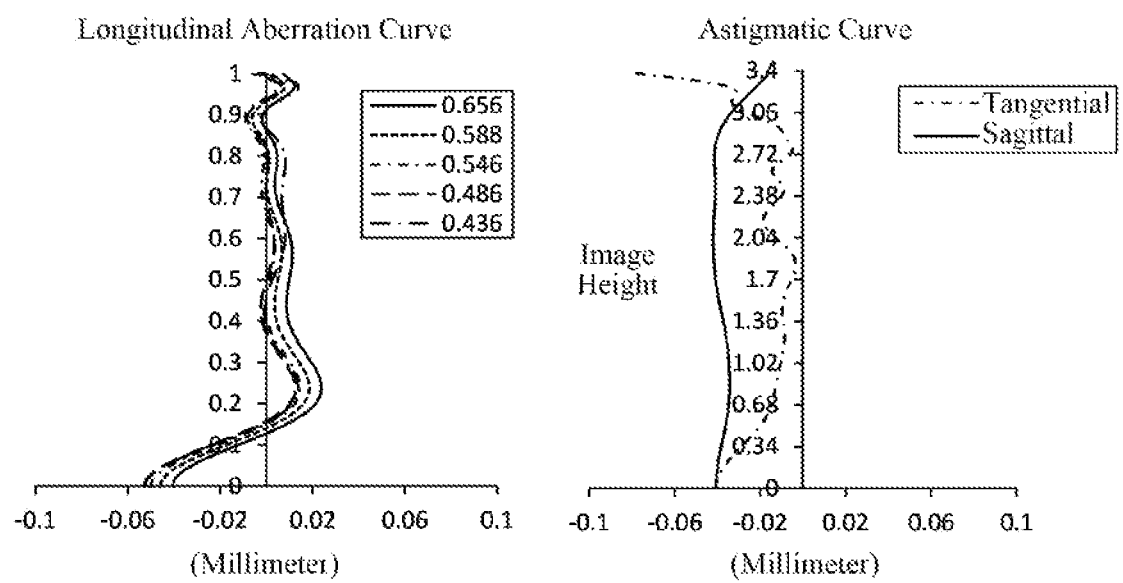
FIGS. 6A to 6D illustrate a longitudinal aberration curve, an astigmatic curve, a distortion curve, and a lateral color curve of the optical imaging lens group of the example 3, respectively.
Figure 6C:
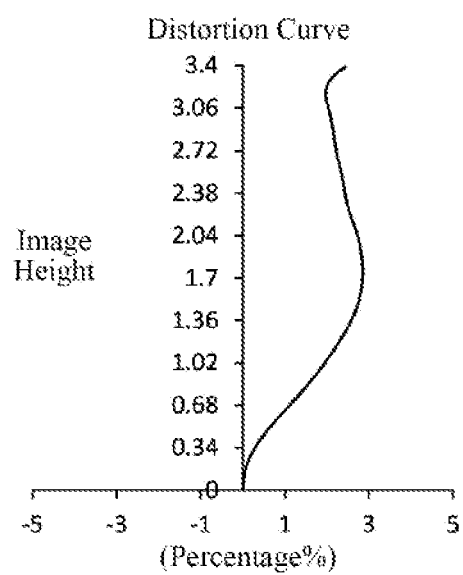
Figure 6D:
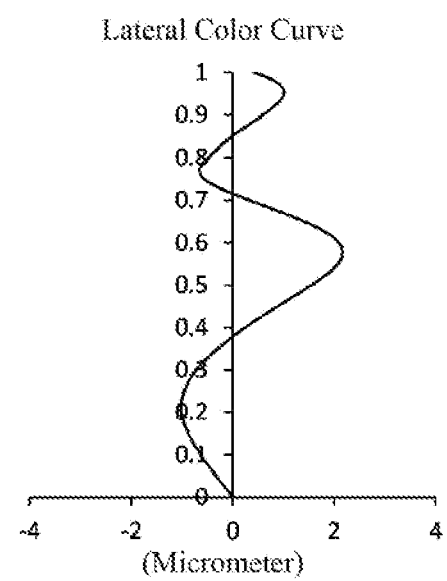

FIG. 6A illustrates a longitudinal aberration curve of the optical imaging lens group according to example 3, representing deviations of focal points converged by light of different wavelengths after passing through the lens group. FIG. 6B illustrates an astigmatic curve of the optical imaging lens group according to example 3, representing a curvature of a tangential plane and a curvature of a sagittal plane. FIG. 6C illustrates a distortion curve of the optical imaging lens group according to example 3, representing amounts of distortion corresponding to different image heights. FIG. 6D illustrates a lateral color curve of the optical imaging lens group according to example 3, representing deviations of different image heights on an imaging plane after light passes through the lens group. It can be seen from FIG. 6A to FIG. 6D that the optical imaging lens group provided in example 3 may achieve good image quality.

EXAMPLE 4

Figure 7:
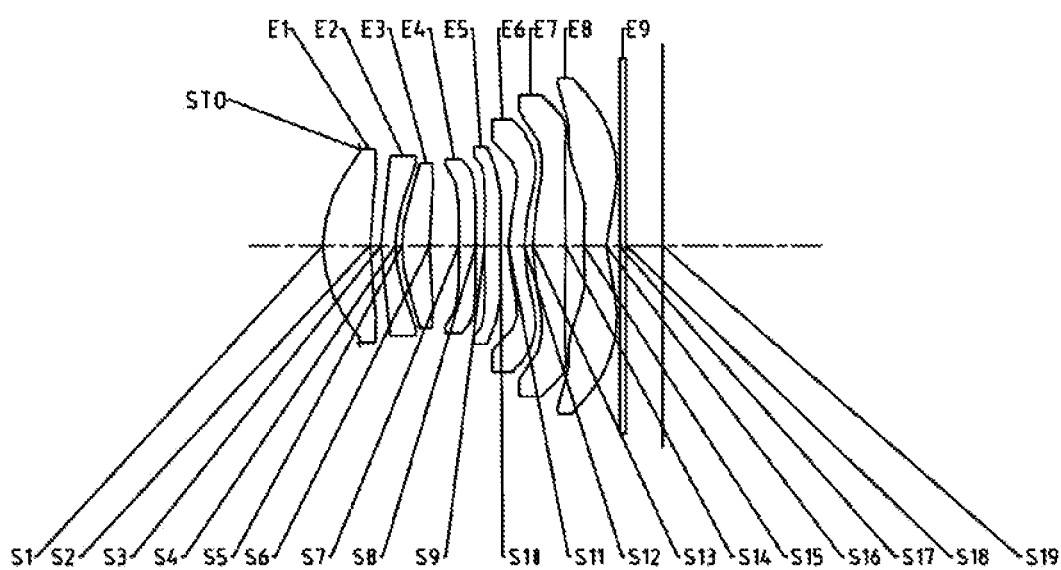
FIG. 7 illustrates a schematic structural view of an optical imaging lens group according to example 4 of the present disclosure.

An optical imaging lens group according to example 4 of the present disclosure is described below with reference to FIG. 7 to FIG. 8D. FIG. 7 shows a schematic structural view of the optical imaging lens group according to example 4 of the present disclosure.

As shown in FIG. 7, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has positive refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 10 shows surface type, radius of curvature, thickness, material and conic coefficient of each lens of the optical imaging lens group in example 4, wherein the units for the radius of curvature and the thickness are millimeter (mm). Table 11 shows high-order coefficients applicable to each aspheric surface in example 4, wherein the surface shape of each aspheric surface may be defined by the formula (1) given in the above example 1. Table 12 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 4.

TABLE 10

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5960 | | | |
| S1 | Aspheric | 2.1478 | 0.7729 | 1.55 | 64.1 | −0.8468 |
| S2 | Aspheric | 4.9610 | 0.1760 | | | −42.1391 |
| S3 | Aspheric | 3.0352 | 0.2400 | 1.67 | 20.4 | −58.9212 |
| S4 | Aspheric | 1.9063 | 0.1127 | | | −6.3221 |
| S5 | Aspheric | 2.3079 | 0.4500 | 1.55 | 64.1 | −2.8642 |
| S6 | Aspheric | 6.5335 | 0.4810 | | | 3.2060 |
| S7 | Aspheric | 33.9302 | 0.2792 | 1.67 | 20.4 | 99.0000 |
| S8 | Aspheric | 20.0571 | 0.1416 | | | 50.1638 |
| S9 | Aspheric | 15.3461 | 0.2657 | 1.67 | 20.4 | 98.4656 |
| S10 | Aspheric | 7.5724 | 0.1292 | | | −58.0704 |
| S11 | Aspheric | 2.3243 | 0.2600 | 1.66 | 21.5 | −15.8037 |
| S12 | Aspheric | 2.2624 | 0.1409 | | | −16.3715 |
| S13 | Aspheric | 3.2310 | 0.5400 | 1.55 | 64.1 | −1.0975 |
| S14 | Aspheric | −10.8610 | 0.2942 | | | −99.0000 |
| S15 | Aspheric | 2.6756 | 0.3725 | 1.55 | 64.1 | −13.0546 |
| S16 | Aspheric | 1.2031 | 0.2177 | | | −5.4747 |
| S17 | Spherical | Infinite | 0.1100 | 1.52 | 64.1 | |
| S18 | Spherical | Infinite | 0.5993 | | | |
| S19 | Spherical | Infinite | | | | |

TABLE 11

| Surface number | A4 | A6 | A8 | A10 | A12 | A14 | A16 | A18 | A20 |
|---|---|---|---|---|---|---|---|---|---|
| S1 | 1.1309E−02 | −9.3711E−03 | 2.7693E−02 | −4.4818E−02 | 4.2442E−02 | −2.4461E−02 | 8.3742E−03 | −1.5715E−03 | 1.2364E−04 |
| S2 | 2.9224E−02 | −3.6090E−02 | 3.2491E−02 | −4.4222E−02 | 4.2173E−02 | −2.3910E−02 | 7.9096E−03 | −1.4225E−03 | 1.0746E−04 |
| S3 | 1.1213E−01 | −2.4576E−01 | 2.9821E−01 | −2.6834E−01 | 1.6899E−01 | −6.6836E−02 | 1.4868E−02 | −1.4805E−03 | 2.1180E−05 |
| S4 | −5.2626E−02 | 2.3699E−01 | −5.8988E−01 | 9.0753E−01 | −9.3950E−01 | 6.5079E−01 | −2.8636E−01 | 7.1947E−02 | −7.8096E−03 |
| S5 | −5.6988E−02 | 1.9988E−01 | −4.6127E−01 | 7.3126E−01 | −8.0400E−01 | 5.8425E−01 | −2.6928E−01 | 7.1534E−02 | −8.2789E−03 |
| S6 | −1.8541E−02 | 6.7138E−03 | −3.7444E−04 | −1.4795E−02 | 1.6099E−02 | −9.8358E−03 | −7.7799E−06 | 2.7023E−03 | −7.6103E−04 |
| S7 | −3.5806E−02 | −4.4276E−03 | −3.3534E−02 | 2.0078E−02 | 2.9894E−02 | −5.7360E−02 | 3.6849E−02 | −1.0192E−02 | 9.6813E−04 |
| S8 | −7.4658E−03 | −1.0043E−01 | 2.5946E−01 | −4.6492E−01 | 5.1903E−01 | −3.6783E−01 | 1.5915E−01 | −3.8068E−02 | 3.8453E−03 |
| S9 | −7.2836E−03 | −1.9174E−01 | 5.0970E−01 | −7.0092E−01 | 5.8411E−01 | −3.0536E−01 | 9.5487E−02 | −1.5835E−02 | 1.0074E−03 |
| S10 | −3.1758E−03 | −3.4789E−01 | 7.5181E−01 | −9.0236E−01 | 6.8375E−01 | −3.3189E−01 | 9.9222E−02 | −1.6516E−02 | 1.1678E−03 |
| S11 | 1.4089E−01 | −3.9535E−01 | 5.3446E−01 | −4.7912E−01 | 2.7971E−01 | −1.0723E−01 | 2.5639E−02 | −3.3676E−03 | 1.8047E−04 |
| S12 | 1.1763E−01 | −2.8608E−01 | 3.3937E−01 | −2.5335E−01 | 1.1876E−01 | −3.4966E−02 | 6.2793E−03 | −6.2798E−04 | 2.6777E−05 |
| S13 | −7.8651E−03 | −1.0651E−01 | 1.4898E−01 | −1.0875E−01 | 4.5730E−02 | −1.1489E−02 | 1.6950E−03 | −1.3448E−04 | 4.3930E−06 |
| S14 | 1.3196E−02 | −2.4600E−02 | 5.6542E−02 | −4.8009E−02 | 2.0785E−02 | −5.0984E−03 | 7.1404E−04 | −5.3179E−05 | 1.6345E−06 |
| S15 | −3.7500E−01 | 2.6674E−01 | −1.1906E−01 | 4.0593E−02 | −9.8522E−03 | 1.5454E−03 | −1.4610E−04 | 7.5350E−06 | −1.6265E−07 |
| S16 | −1.9746E−01 | 1.4507E−01 | −7.7014E−02 | 2.8857E−02 | −7.5130E−03 | 1.3066E−03 | −1.4249E−04 | 8.7125E−06 | −2.2627E−07 |

TABLE 12

| ImgH (mm) | 3.39 | f3 (mm) | 6.29 |
|---|---|---|---|
| TTL (mm) | 5.58 | f4 (mm) | −74.01 |
| HFOV (°) | 37.2 | f5 (mm) | −22.68 |
| f (mm) | 4.32 | f6 (mm) | 194.01 |
| f1 (mm) | 6.32 | f7 (mm) | 4.62 |
| f2 (mm) | −8.39 | f8 (mm) | −4.39 |

Figure 8A:
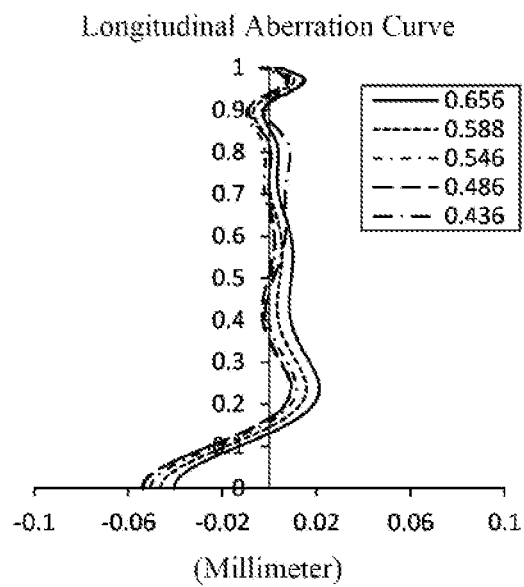
FIGS. 8A to 8D illustrate a longitudinal aberration curve, an astigmatic curve, a distortion curve, and a lateral color curve of the optical imaging lens group of the example 4, respectively.
Figure 8B:
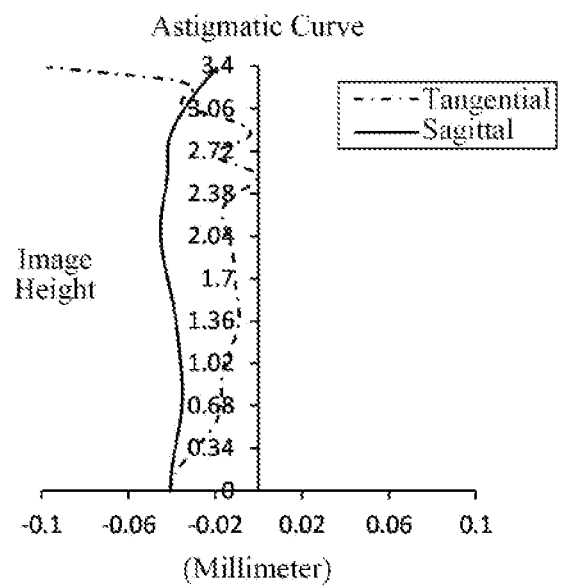
Figure 8C:
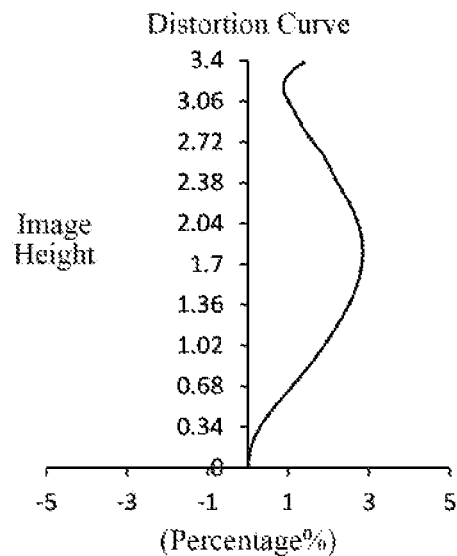
Figure 8D:
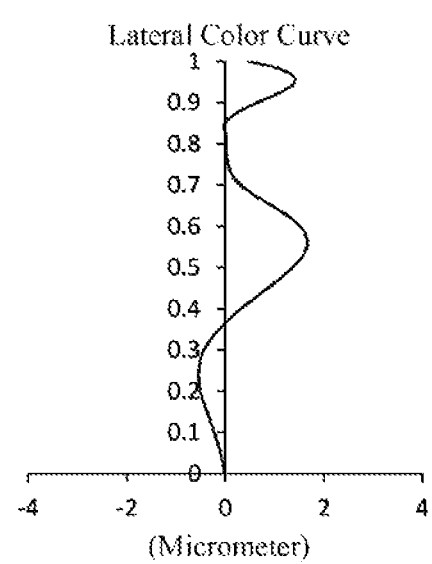

FIG. 8A illustrates a longitudinal aberration curve of the optical imaging lens group according to example 4, representing deviations of focal points converged by light of different wavelengths after passing through the lens group. FIG. 8B illustrates an astigmatic curve of the optical imaging lens group according to example 4, representing a curvature of a tangential plane and a curvature of a sagittal plane. FIG. 8C illustrates a distortion curve of the optical imaging lens group according to example 4, representing amounts of distortion corresponding to different image heights. FIG. 8D illustrates a lateral color curve of the optical imaging lens group according to example 4, representing deviations of different image heights on an imaging plane after light passes through the lens group. It can be seen from FIG. 8A to FIG. 8D that the optical imaging lens group provided in example 4 may achieve good image quality.

EXAMPLE 5

Figure 9:
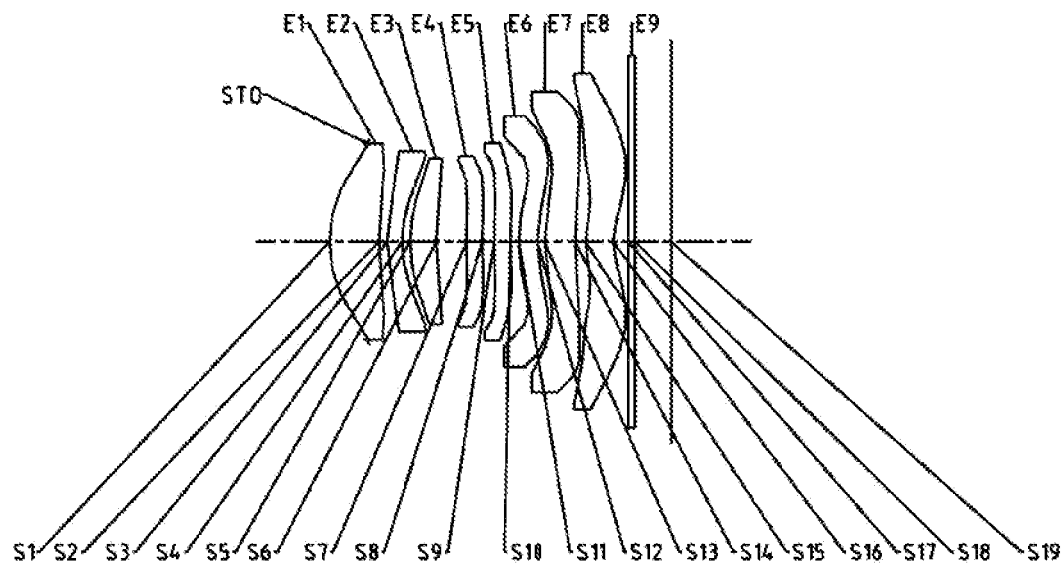
FIG. 9 illustrates a schematic structural view of an optical imaging lens group according to example 5 of the present disclosure.

An optical imaging lens group according to example 5 of the present disclosure is described below with reference to FIG. 9 to FIG. 10D. FIG. 9 shows a schematic structural view of the optical imaging lens group according to example 5 of the present disclosure.

As shown in FIG. 9, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is concave. The eighth lens E8 has positive refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 13 shows surface type, radius of curvature, thickness, material and conic coefficient of each lens of the optical imaging lens group in example 5, wherein the units for the radius of curvature and the thickness are millimeter (mm). Table 14 shows high-order coefficients applicable to each aspheric surface in example 5, wherein the surface shape of each aspheric surface may be defined by the formula (1) given in the above example 1. Table 15 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 5.

TABLE 13

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5960 | | | |
| S1 | Aspheric | 2.1806 | 0.8130 | 1.55 | 64.1 | −0.6555 |
| S2 | Aspheric | 6.0388 | 0.1424 | | | −36.7159 |
| S3 | Aspheric | 2.9391 | 0.2400 | 1.67 | 20.4 | −33.5593 |
| S4 | Aspheric | 1.8325 | 0.1310 | | | −4.9646 |
| S5 | Aspheric | 2.4586 | 0.4358 | 1.55 | 64.1 | −1.8707 |
| S6 | Aspheric | 6.3641 | 0.4974 | | | 16.1115 |
| S7 | Aspheric | 14.6534 | 0.2600 | 1.67 | 20.4 | 99.0000 |
| S8 | Aspheric | 13.7677 | 0.1933 | | | 71.8112 |
| S9 | Aspheric | 14.6937 | 0.2700 | 1.67 | 20.4 | 83.2284 |
| S10 | Aspheric | 8.2843 | 0.1388 | | | 11.3999 |
| S11 | Aspheric | 2.7573 | 0.3000 | 1.66 | 21.5 | −11.3409 |
| S12 | Aspheric | 2.3604 | 0.1210 | | | −18.5432 |
| S13 | Aspheric | 2.7105 | 0.5000 | 1.55 | 64.1 | −1.7712 |
| S14 | Aspheric | 3.2880 | 0.1778 | | | −96.5539 |
| S15 | Aspheric | 1.2994 | 0.4543 | 1.55 | 64.1 | −6.6126 |
| S16 | Aspheric | 1.1415 | 0.2485 | | | −3.9192 |
| S17 | Spherical | Infinite | 0.1100 | 1.52 | 64.1 | |
| S18 | Spherical | Infinite | 0.5981 | | | |
| S19 | Spherical | Infinite | | | | |

TABLE 14

| Surface number | A4 | A6 | A8 | A10 | A12 | A14 | A16 | A18 | A20 |
|---|---|---|---|---|---|---|---|---|---|
| S1 | 1.1341E−02 | −1.8769E−02 | 4.2712E−02 | −5.6384E−02 | 4.4795E−02 | −2.2080E−02 | 6.5645E−03 | −1.0870E−03 | 7.6841E−05 |
| S2 | 9.4355E−03 | 1.7224E−02 | −7.2100E−02 | 8.9693E−02 | −6.6751E−02 | 3.1891E−02 | −9.5570E−03 | 1.6330E−03 | −1.2153E−04 |
| S3 | 7.2169E−02 | −1.2596E−01 | 1.2278E−01 | −1.1330E−01 | 8.7271E−02 | −4.5869E−02 | 1.5267E−02 | −2.9245E−03 | 2.4627E−04 |
| S4 | −3.1018E−02 | 1.3735E−01 | −2.9383E−01 | 3.7185E−01 | −3.1434E−01 | 1.7837E−01 | −6.5817E−02 | 1.4736E−02 | −1.5423E−03 |
| S5 | −3.0627E−02 | 3.8879E−02 | 2.6959E−02 | −1.8127E−01 | 2.9429E−01 | −2.5909E−01 | 1.2725E−01 | −3.1959E−02 | 3.1739E−03 |
| S6 | −1.9582E−02 | −9.3712E−03 | 4.8353E−02 | −1.2638E−01 | 1.8489E−01 | −1.6576E−01 | 8.5306E−02 | −2.2727E−02 | 2.4217E−03 |
| S7 | −2.5889E−02 | 4.6141E−03 | −1.0896E−01 | 2.3723E−01 | −3.0942E−01 | 2.5220E−01 | −1.2754E−01 | 3.6695E−02 | −4.5686E−03 |
| S8 | 2.9682E−04 | −9.3471E−02 | 2.0035E−01 | −3.3853E−01 | 3.6657E−01 | −2.5448E−01 | 1.0775E−01 | −2.5120E−02 | 2.4694E−03 |
| S9 | 1.3577E−02 | −2.3724E−01 | 5.2717E−01 | −6.5024E−01 | 4.8670E−01 | −2.2056E−01 | 5.4388E−02 | −5.2294E−03 | −1.2202E−04 |
| S10 | 6.4355E−02 | −5.5528E−01 | 1.0697E+00 | −1.2163E+00 | 8.8945E−01 | −4.1987E−01 | 1.2279E−01 | −2.0098E−02 | 1.4013E−03 |
| S11 | 1.5500E−01 | −4.5318E−01 | 6.1667E−01 | −5.4848E−01 | 3.2011E−01 | −1.2241E−01 | 2.8956E−02 | −3.7393E−03 | 1.9641E−04 |
| S12 | 8.2113E−02 | −1.5411E−01 | 1.3775E−01 | −8.0091E−02 | 2.8903E−02 | −6.4583E−03 | 8.8412E−04 | −7.0096E−05 | 2.5753E−06 |
| S13 | −1.6545E−01 | 2.1710E−01 | −1.9741E−01 | 9.9873E−02 | −3.0664E−02 | 6.1125E−03 | −8.1267E−04 | 6.7772E−05 | −2.6727E−06 |
| S14 | −1.8675E−01 | 3.3651E−01 | −2.7614E−01 | 1.2789E−01 | −3.6375E−02 | 6.5408E−03 | −7.3294E−04 | 4.7092E−05 | −1.3294E−06 |
| S15 | −4.1869E−01 | 3.7100E−01 | −2.0633E−01 | 7.8233E−02 | −1.9638E−02 | 3.1585E−03 | −3.1206E−04 | 1.7270E−05 | −4.1101E−07 |
| S16 | −2.2881E−01 | 1.7325E−01 | −9.2388E−02 | 3.3034E−02 | −7.9216E−03 | 1.2567E−03 | −1.2582E−04 | 7.1580E−06 | −1.7548E−07 |

TABLE 15

| | | | |
|---|---|---|---|
| ImgH (mm) | 3.39 | f3 (mm) | 7.05 |
| TTL (mm) | 5.63 | f4 (mm) | −386.34 |
| HFOV (°) | 36.2 | f5 (mm) | −28.91 |
| f (mm) | 4.50 | f6 (mm) | −35.62 |
| f1 (mm) | 5.81 | f7 (mm) | 21.62 |
| f2 (mm) | −7.98 | f8 (mm) | 999.64 |

Figures 10A, 10B:
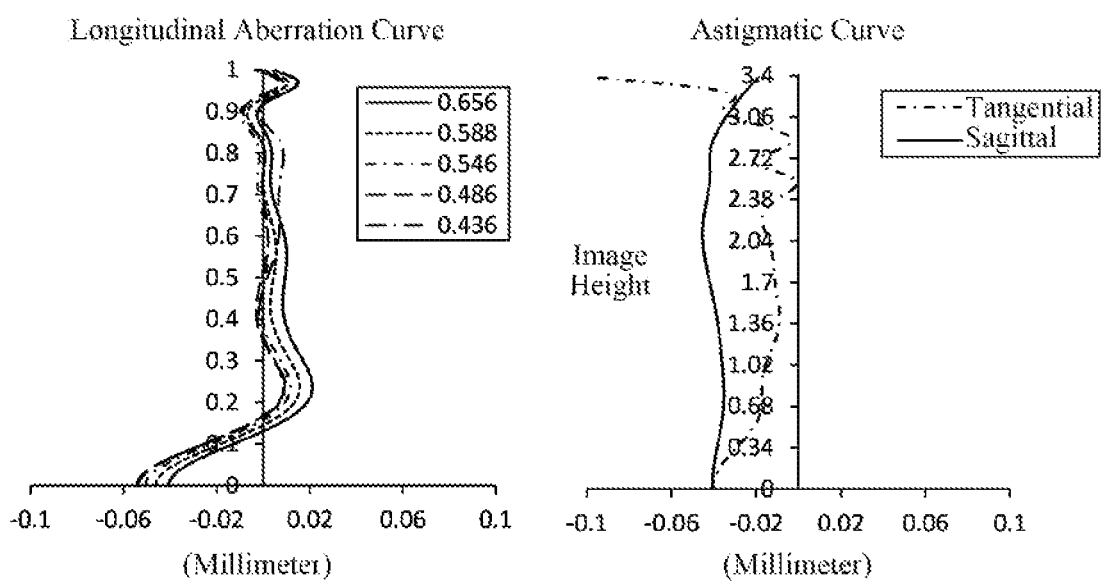
FIGS. 10A to 10D illustrate a longitudinal aberration curve, an astigmatic curve, a distortion curve, and a lateral color curve of the optical imaging lens group of the example 5, respectively.
Figure 10C:
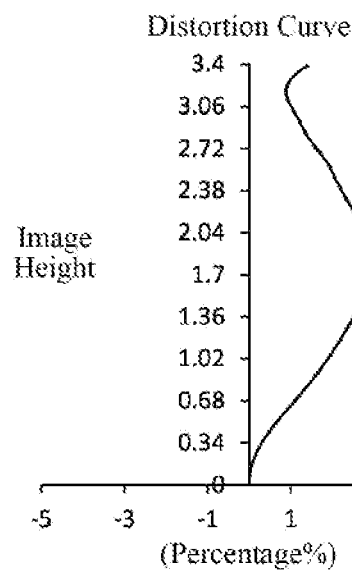
Figure 10D:
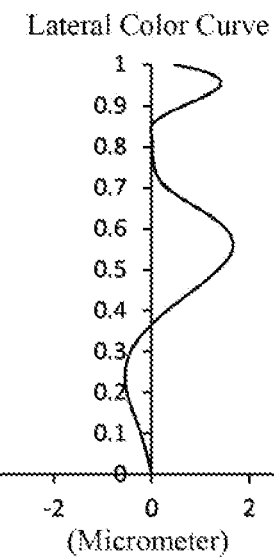

FIG. 10A illustrates a longitudinal aberration curve of the optical imaging lens group according to example 5, representing deviations of focal points converged by light of different wavelengths after passing through the lens group. FIG. 10B illustrates an astigmatic curve of the optical imaging lens group according to example 5, representing a curvature of a tangential plane and a curvature of a sagittal plane. FIG. 10C illustrates a distortion curve of the optical imaging lens group according to example 5, representing amounts of distortion corresponding to different image heights. FIG. 10D illustrates a lateral color curve of the optical imaging lens group according to example 5, representing deviations of different image heights on an imaging plane after light passes through the lens group. It can be seen from FIG. 10A to FIG. 10D that the optical imaging lens group provided in example 5 may achieve good image quality.

EXAMPLE 6

Figure 11:
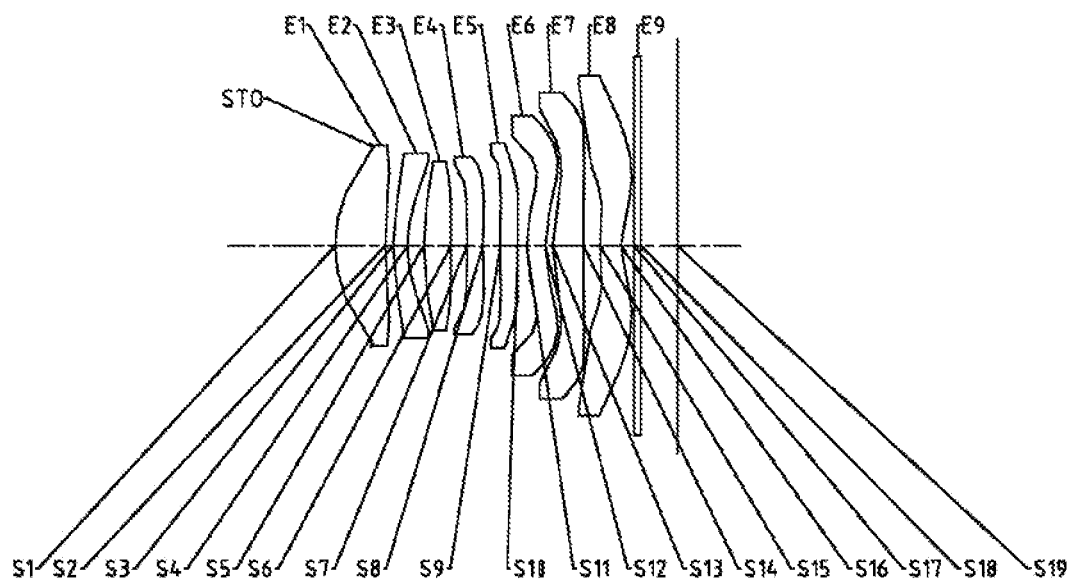
FIG. 11 illustrates a schematic structural view of an optical imaging lens group according to example 6 of the present disclosure.

An optical imaging lens group according to example 6 of the present disclosure is described below with reference to FIG. 11 to FIG. 12D. FIG. 11 shows a schematic structural view of the optical imaging lens group according to example 6 of the present disclosure.

As shown in FIG. 11, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is convex. The fourth lens E4 has negative refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 16 shows surface type, radius of curvature, thickness, material and conic coefficient of each lens of the optical imaging lens group in example 6, wherein the units for the radius of curvature and the thickness are millimeter (mm). Table 17 shows high-order coefficients applicable to each aspheric surface in example 6, wherein the surface shape of each aspheric surface may be defined by the formula (1) given in the above example 1. Table 18 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 6.

TABLE 16

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5960 | | | |
| S1 | Aspheric | 2.1902 | 0.8192 | 1.55 | 64.1 | −0.6647 |
| S2 | Aspheric | 7.5179 | 0.1213 | | | −54.2436 |
| S3 | Aspheric | 2.7217 | 0.2400 | 1.67 | 20.4 | −43.0662 |
| S4 | Aspheric | 1.9034 | 0.2643 | | | −5.8689 |
| S5 | Aspheric | 4.4577 | 0.4469 | 1.55 | 64.1 | −1.6534 |
| S6 | Aspheric | −800.0000 | 0.2636 | | | 99.0000 |
| S7 | Aspheric | 175.5418 | 0.2600 | 1.67 | 20.4 | −97.7633 |
| S8 | Aspheric | 14.7219 | 0.2802 | | | 85.0742 |
| S9 | Aspheric | 14.3021 | 0.2852 | 1.67 | 20.4 | 77.8741 |
| S10 | Aspheric | 9.8009 | 0.1501 | | | 10.6350 |
| S11 | Aspheric | 2.5808 | 0.3000 | 1.66 | 21.5 | −9.6253 |
| S12 | Aspheric | 2.1255 | 0.1234 | | | −15.3587 |
| S13 | Aspheric | 2.5472 | 0.5000 | 1.55 | 64.1 | −1.9675 |
| S14 | Aspheric | −46.7686 | 0.2728 | | | −95.9546 |
| S15 | Aspheric | 2.2259 | 0.3375 | 1.55 | 64.1 | −12.0286 |
| S16 | Aspheric | 1.1363 | 0.2189 | | | −5.6035 |
| S17 | Spherical | Infinite | 0.1100 | 1.52 | 64.1 | |
| S18 | Spherical | Infinite | 0.5980 | | | |
| S19 | Spherical | Infinite | | | | |

TABLE 17

| Surface number | A4 | A6 | A8 | A10 | A12 |
|---|---|---|---|---|---|
| S1 | 6.2497E−03 | 5.8948E−03 | −1.1493E−02 | 1.4238E−02 | −1.1378E−02 |
| S2 | −1.4352E−02 | 2.5038E−02 | −9.7594E−03 | −2.5376E−02 | 3.6861E−02 |
| S3 | 9.8701E−02 | −2.7446E−01 | 4.4187E−01 | −4.9277E−01 | 3.6640E−01 |
| S4 | −2.0283E−02 | 4.8495E−02 | −8.5929E−02 | 1.1861E−01 | −1.4726E−01 |
| S5 | −1.1547E−02 | −4.5140E−03 | 8.7181E−02 | −2.6058E−01 | 3.8107E−01 |
| S6 | −7.8778E−03 | −5.8973E−02 | 2.1384E−01 | −4.5162E−01 | 5.7896E−01 |
| S7 | −2.4313E−02 | −4.3686E−02 | 1.0133E−01 | −2.2946E−01 | 3.1390E−01 |
| S8 | −1.0183E−02 | −8.0375E−02 | 2.0607E−01 | −3.6769E−01 | 3.9390E−01 |
| S9 | 2.2094E−05 | −1.6607E−01 | 3.2612E−01 | −2.9876E−01 | 1.0712E−01 |
| S10 | 6.6629E−02 | −5.4086E−01 | 1.0089E+00 | −1.1174E+00 | 7.9972E−01 |
| S11 | 1.4269E−01 | −3.8560E−01 | 5.0801E−01 | −4.5461E−01 | 2.6989E−01 |
| S12 | 8.0786E−02 | −1.4692E−01 | 1.2917E−01 | −7.8949E−02 | 3.1847E−02 |
| S13 | −1.0291E−01 | 5.8547E−02 | −2.8067E−02 | 1.0445E−02 | 4.5142E−03 |
| S14 | −6.1800E−03 | 2.2405E−02 | 5.1669E−03 | −2.2762E−02 | 1.4703E−02 |
| S15 | −3.8784E−01 | 3.0451E−01 | −1.6059E−01 | 6.3836E−02 | −1.7314E−02 |
| S16 | −1.9921E−01 | 1.4290E−01 | −7.4573E−02 | 2.7005E−02 | −6.7466E−03 |

| Surface number | A14 | A16 | A18 | A20 |
|---|---|---|---|---|
| S1 | 5.5957E−03 | −1.6596E−03 | 2.5511E−04 | −1.5154E−05 |
| S2 | −2.3641E−02 | 8.3275E−03 | −1.5584E−03 | 1.2084E−04 |
| S3 | −1.7695E−01 | 5.3705E−02 | −9.3270E−03 | 7.0583E−04 |
| S4 | 1.3173E−01 | −7.3119E−02 | 2.2540E−02 | −2.9161E−03 |
| S5 | −3.2609E−01 | 1.6013E−01 | −4.1073E−02 | 4.2648E−03 |
| S6 | −4.6536E−01 | 2.2575E−01 | −5.9913E−02 | 6.6813E−03 |
| S7 | −2.6901E−01 | 1.3988E−01 | −4.0160E−02 | 4.8714E−03 |
| S8 | −2.6575E−01 | 1.1031E−01 | −2.5695E−02 | 2.5688E−03 |
| S9 | 3.0019E−02 | −4.3830E−02 | 1.5767E−02 | −2.0052E−03 |
| S10 | −3.7227E−01 | 1.0812E−01 | −1.7639E−02 | 1.2256E−03 |
| S11 | −1.0571E−01 | 2.5703E−02 | −3.4131E−03 | 1.8403E−04 |
| S12 | −8.3703E−03 | 1.3843E−03 | −1.3048E−04 | 5.3174E−06 |
| S13 | −1.8940E−03 | 3.4173E−04 | −2.8856E−05 | 8.9965E−07 |
| S14 | −4.4887E−03 | 7.2986E−04 | −6.0987E−05 | 2.0631E−06 |
| S15 | 2.9710E−03 | −3.0605E−04 | 1.7270E−05 | −4.1101E−07 |
| S16 | 1.1428E−03 | −1.2423E−04 | 7.7248E−06 | −2.0681E−07 |

TABLE 18

| | | | |
|---|---|---|---|
| ImgH (mm) | 3.39 | f3 (mm) | 8.11 |
| TTL (mm) | 5.59 | f4 (mm) | −24.07 |
| HFOV (°) | 37.0 | f5 (mm) | −47.82 |
| f (mm) | 4.32 | f6 (mm) | −24.81 |
| f1 (mm) | 5.36 | f7 (mm) | 4.44 |
| f2 (mm) | −10.74 | f8 (mm) | −4.77 |

Figure 12A:
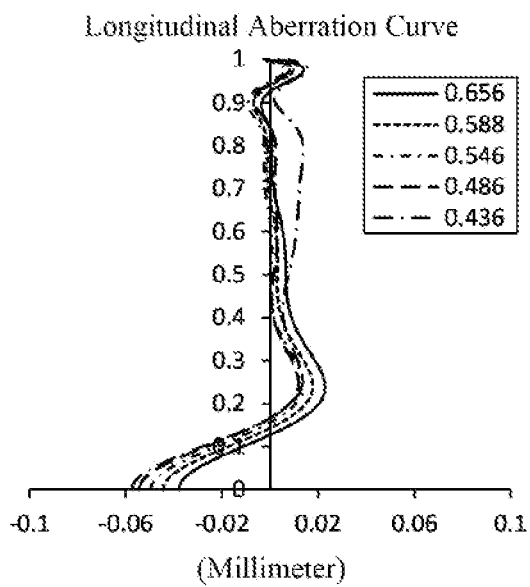
FIGS. 12A to 12D illustrate a longitudinal aberration curve, an astigmatic curve, a distortion curve, and a lateral color curve of the optical imaging lens group of the example 6, respectively.
Figure 12B:
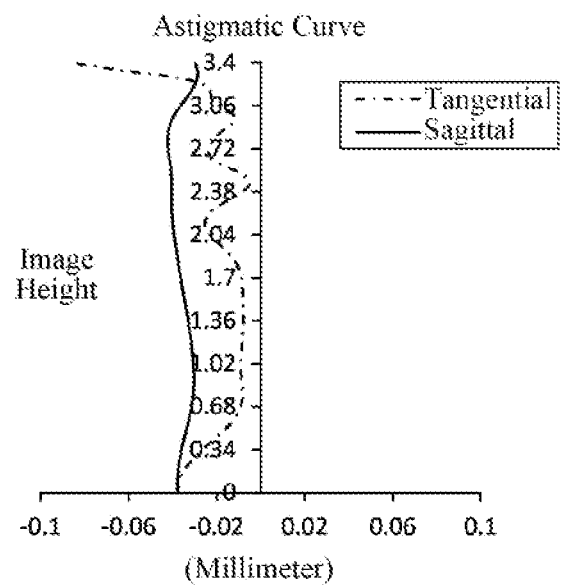
Figure 12C:
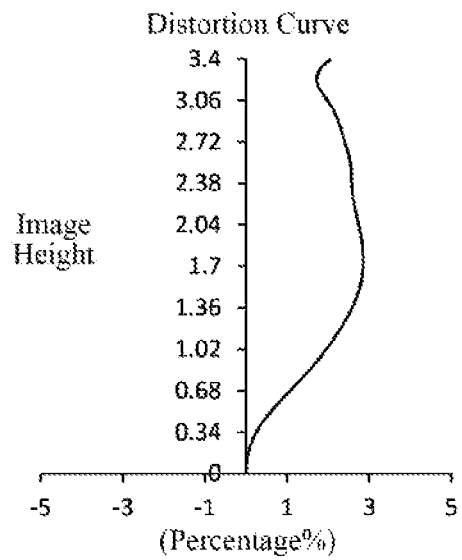
Figure 12D:
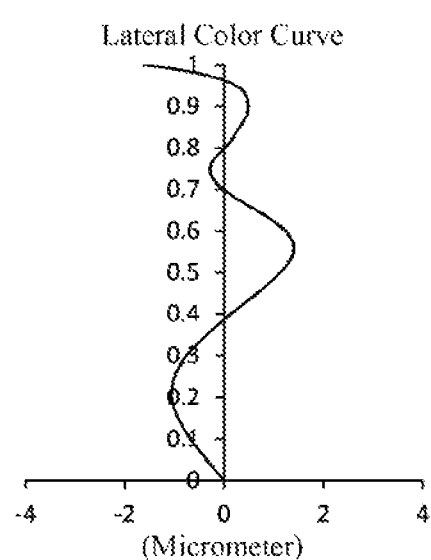

FIG. 12A illustrates a longitudinal aberration curve of the optical imaging lens group according to example 6, representing deviations of focal points converged by light of different wavelengths after passing through the lens group. FIG. 12B illustrates an astigmatic curve of the optical imaging lens group according to example 6, representing a curvature of a tangential plane and a curvature of a sagittal plane. FIG. 12C illustrates a distortion curve of the optical imaging lens group according to example 6, representing amounts of distortion corresponding to different image heights. FIG. 12D illustrates a lateral color curve of the optical imaging lens group according to example 6, representing deviations of different image heights on an imaging plane after light passes through the lens group. It can be seen from FIG. 12A to FIG. 12D that the optical imaging lens group provided in example 6 may achieve good image quality.

EXAMPLE 7

Figure 13:
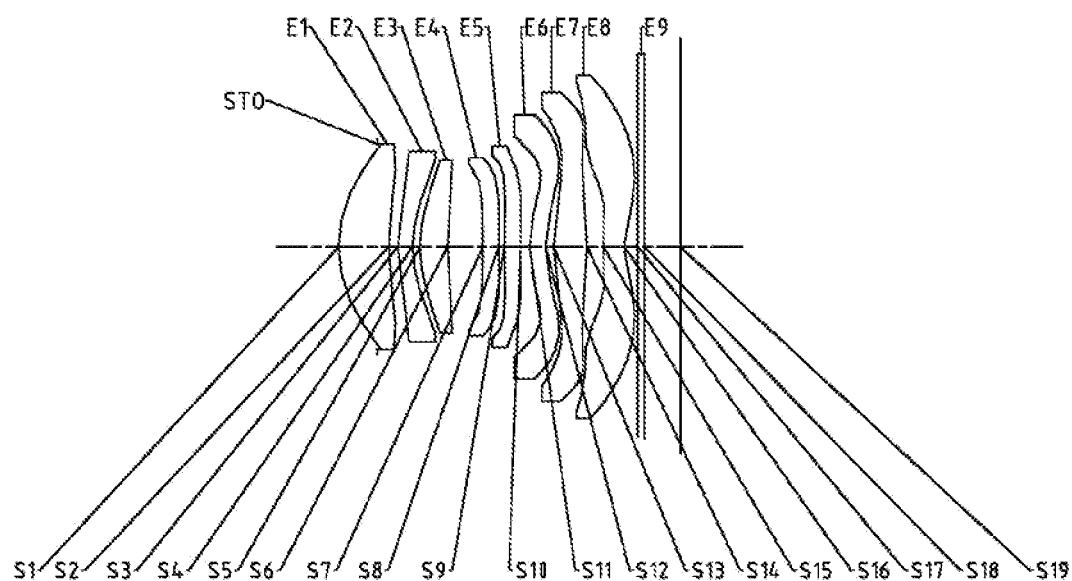
FIG. 13 illustrates a schematic structural view of an optical imaging lens group according to example 7 of the present disclosure.

An optical imaging lens group according to example 7 of the present disclosure is described below with reference to FIG. 13 to FIG. 14D. FIG. 13 shows a schematic structural view of the optical imaging lens group according to example 7 of the present disclosure.

As shown in FIG. 13, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is concave, and an image-side surface S8 thereof is convex. The fifth lens E5 has negative refractive power, an object-side surface S9 thereof is convex, and an image-side surface S10 thereof is concave. The sixth lens E6 has positive refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 19 shows surface type, radius of curvature, thickness, material and conic coefficient of each lens of the optical imaging lens group in example 7, wherein the units for the radius of curvature and the thickness are millimeter (mm). Table 20 shows high-order coefficients applicable to each aspheric surface in example 7, wherein the surface shape of each aspheric surface may be defined by the formula (1) given in the above example 1. Table 21 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 7.

TABLE 19

| Surface number | Surface type | Radius of curvature | Thickness | Material Refractive index | Material Abbe number | Conic coefficient |
|---|---|---|---|---|---|---|
| OBJ | Spherical | Infinite | Infinite | | | |
| STO | Spherical | Infinite | −0.6300 | | | |
| S1 | Aspheric | 2.1602 | 0.8200 | 1.55 | 64.1 | −0.6742 |
| S2 | Aspheric | 5.1264 | 0.1461 | | | −36.1902 |
| S3 | Aspheric | 2.8761 | 0.2400 | 1.67 | 20.4 | −48.2921 |
| S4 | Aspheric | 1.8142 | 0.1228 | | | −5.7485 |
| S5 | Aspheric | 2.2268 | 0.4500 | 1.55 | 64.1 | −2.6670 |
| S6 | Aspheric | 6.1117 | 0.5757 | | | 8.8359 |
| S7 | Aspheric | −1000.0000 | 0.2600 | 1.67 | 20.4 | −99.0000 |
| S8 | Aspheric | −508.7416 | 0.0946 | | | −99.0000 |
| S9 | Aspheric | 45.6612 | 0.2600 | 1.67 | 20.4 | 99.0000 |
| S10 | Aspheric | 9.5031 | 0.1502 | | | −14.8796 |
| S11 | Aspheric | 1.9831 | 0.2600 | 1.66 | 21.5 | −16.7653 |
| S12 | Aspheric | 1.9072 | 0.1346 | | | −16.0744 |
| S13 | Aspheric | 4.0317 | 0.5400 | 1.55 | 64.1 | 0.0409 |
| S14 | Aspheric | −5.1098 | 0.2685 | | | −38.5057 |
| S15 | Aspheric | 2.7399 | 0.3375 | 1.55 | 64.1 | −14.7076 |
| S16 | Aspheric | 1.1493 | 0.2211 | | | −5.6358 |
| S17 | Spherical | Infinite | 0.1100 | 1.52 | 64.1 | |
| S18 | Spherical | Infinite | 0.5890 | | | |
| S19 | Spherical | Infinite | | | | |

TABLE 20

| Surface number | A4 | A6 | A8 | A10 | A12 |
|---|---|---|---|---|---|
| S1 | 7.9111E−03 | −2.6890E−03 | 1.1137E−02 | −1.9523E−02 | 1.8149E−02 |
| S2 | 2.4284E−02 | −1.4666E−02 | −1.2882E−02 | 9.2180E−03 | 3.1198E−03 |
| S3 | 1.1056E−01 | −2.0540E−01 | 2.1418E−01 | −1.8621E−01 | 1.2967E−01 |
| S4 | −4.6675E−02 | 1.9886E−01 | −4.2480E−01 | 5.3249E−01 | −4.3975E−01 |
| S5 | −5.4241E−02 | 1.6034E−01 | −3.0951E−01 | 4.1765E−01 | −4.0496E−01 |
| S6 | −1.8077E−02 | 8.1369E−03 | −1.4192E−02 | 2.4597E−02 | −4.0954E−02 |
| S7 | −1.7789E−02 | −7.0820E−02 | 1.3879E−01 | −2.4112E−01 | 2.6425E−01 |
| S8 | 7.7441E−02 | −4.2194E−01 | 1.0244E+00 | −1.6132E+00 | 1.6054E+00 |
| S9 | 1.0742E−01 | −5.3276E−01 | 1.2168E+00 | −1.6684E+00 | 1.4283E+00 |
| S10 | −1.0211E−02 | −2.6521E−01 | 5.4493E−01 | −6.0574E−01 | 4.0222E−01 |
| S11 | 1.2965E−01 | −2.9366E−01 | 3.3656E−01 | −2.5776E−01 | 1.2151E−01 |
| S12 | 1.3003E−01 | −2.6369E−01 | 2.8334E−01 | −2.0051E−01 | 8.9878E−02 |
| S13 | 5.7254E−03 | −1.0500E−01 | 1.3051E−01 | −8.7564E−02 | 3.3899E−02 |
| S14 | 2.1073E−02 | −5.8337E−02 | 9.1082E−02 | −6.3829E−02 | 2.4609E−02 |
| S15 | −3.9933E−01 | 2.8681E−01 | −1.2756E−01 | 4.2716E−02 | −1.0156E−02 |
| S16 | −2.1395E−01 | 1.6150E−01 | −8.6607E−02 | 3.2569E−02 | −8.4836E−03 |

| Surface number | A14 | A16 | A18 | A20 |
|---|---|---|---|---|
| S1 | −9.9181E−03 | 3.1627E−03 | −5.5003E−04 | 3.9753E−05 |
| S2 | −5.5673E−03 | 2.5102E−03 | −5.1553E−04 | 4.1255E−05 |
| S3 | −6.3225E−02 | 1.9817E−02 | −3.5889E−03 | 2.8639E−04 |
| S4 | 2.4675E−01 | −9.2023E−02 | 2.0855E−02 | −2.1611E−03 |
| S5 | 2.7010E−01 | −1.2073E−01 | 3.2813E−02 | −3.9991E−03 |
| S6 | 3.9631E−02 | −2.5521E−02 | 9.7942E−03 | −1.5727E−03 |
| S7 | −1.7420E−01 | 6.3265E−02 | −1.0321E−02 | 3.2665E−04 |
| S8 | −1.0110E+00 | 3.8962E−01 | −8.3707E−02 | 7.6772E−03 |
| S9 | −7.7297E−01 | 2.5653E−01 | −4.7791E−02 | 3.8457E−03 |
| S10 | −1.5899E−01 | 3.4675E−02 | −3.3558E−03 | 5.0160E−05 |
| S11 | −3.4585E−02 | 5.3904E−03 | −3.1711E−04 | −7.2487E−06 |
| S12 | −2.5188E−02 | 4.2798E−03 | −4.0349E−04 | 1.6206E−05 |
| S13 | −7.7654E−03 | 1.0289E−03 | −7.1735E−05 | 1.9854E−06 |
| S14 | −5.5830E−03 | 7.3973E−04 | −5.2882E−05 | 1.5755E−06 |
| S15 | 1.5683E−03 | −1.4680E−04 | 7.5350E−06 | −1.6265E−07 |
| S16 | 1.4745E−03 | −1.6072E−04 | 9.8305E−06 | −2.5575E−07 |

TABLE 21

| ImgH (mm) | 3.39 | f3 (mm) | 6.16 |
|---|---|---|---|
| TTL (mm) | 5.58 | f4 (mm) | 1549.59 |
| HFOV (°) | 37.0 | f5 (mm) | −18.01 |
| f (mm) | 4.34 | f6 (mm) | 210.99 |
| f1 (mm) | 6.22 | f7 (mm) | 4.21 |
| f2 (mm) | −8.09 | f8 (mm) | −3.92 |

Figures 14A, 14B:
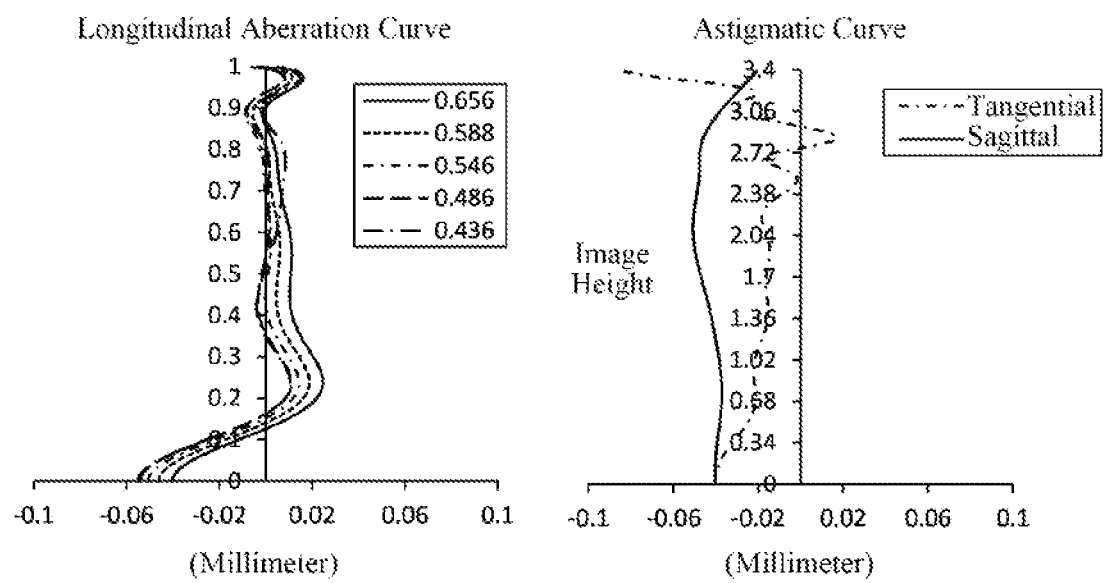
FIGS. 14A to 14D illustrate a longitudinal aberration curve, an astigmatic curve, a distortion curve, and a lateral color curve of the optical imaging lens group of the example 7, respectively.
Figure 14C:
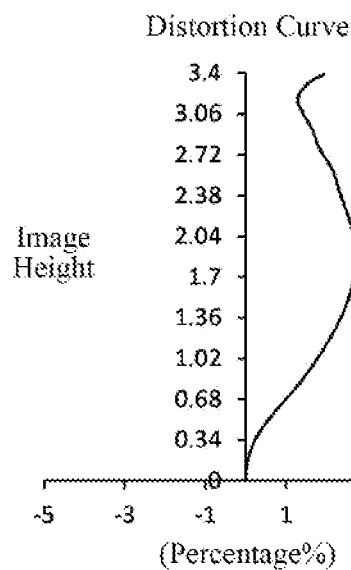
Figure 14D:
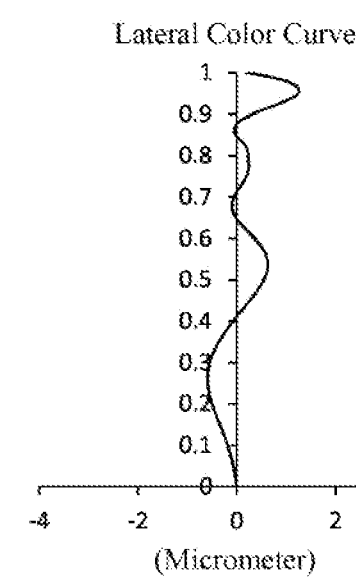

FIG. 14A illustrates a longitudinal aberration curve of the optical imaging lens group according to example 7, representing deviations of focal points converged by light of different wavelengths after passing through the lens group. FIG. 14B illustrates an astigmatic curve of the optical imaging lens group according to example 7, representing a curvature of a tangential plane and a curvature of a sagittal plane. FIG. 14C illustrates a distortion curve of the optical imaging lens group according to example 7, representing amounts of distortion corresponding to different image heights. FIG. 14D illustrates a lateral color curve of the optical imaging lens group according to example 7, representing deviations of different image heights on an imaging plane after light passes through the lens group. It can be seen from FIG. 14A to FIG. 14D that the optical imaging lens group provided in example 7 may achieve good image quality.

EXAMPLE 8

Figure 15:
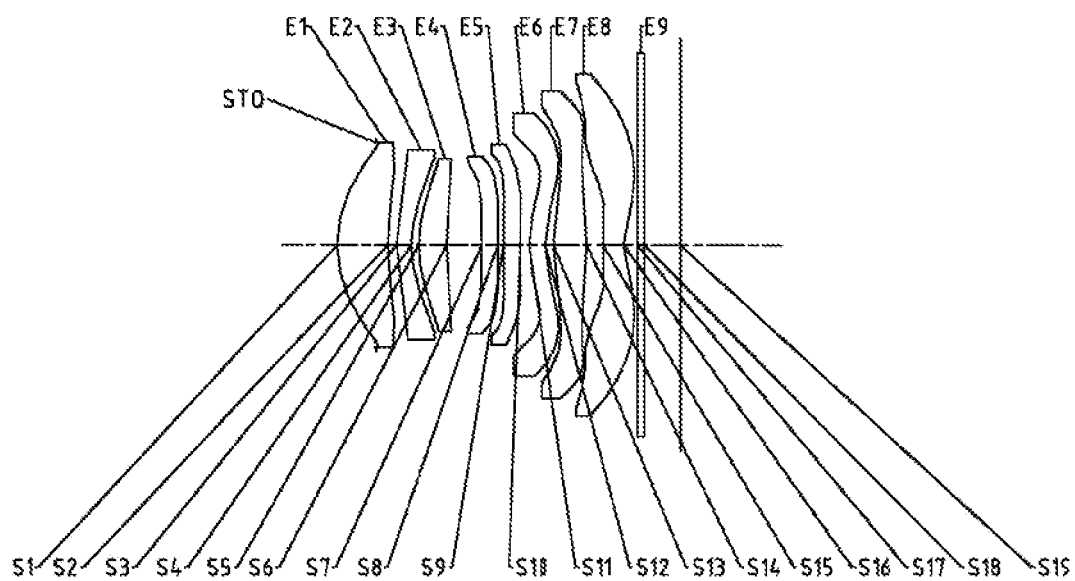
FIG. 15 illustrates a schematic structural view of an optical imaging lens group according to example 8 of the present disclosure.

An optical imaging lens group according to example 8 of the present disclosure is described below with reference to FIG. 15 to FIG. 16D. FIG. 15 shows a schematic structural view of the optical imaging lens group according to example 8 of the present disclosure.

As shown in FIG. 15, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has positive refractive power, an object-side surface S7 thereof is convex, and an image-side surface S8 thereof is convex. The fifth lens E5 has negative refractive power, an object-side surface S9 thereof is convex, and an image-side surface S10 thereof is concave. The sixth lens E6 has positive refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 22 shows surface type, radius of curvature, thickness, material and conic coefficient of each lens of the optical imaging lens group in example 8, wherein the units for the radius of curvature and the thickness are millimeter (mm). Table 23 shows high-order coefficients applicable to each aspheric surface in example 8, wherein the surface shape of each aspheric surface may be defined by the formula (1) given in the above example 1. Table 24 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 8.

TABLE 22

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.6300 | | | |
| S1 | Aspheric | 2.1580 | 0.8200 | 1.55 | 64.1 | −0.6763 |
| S2 | Aspheric | 5.0946 | 0.1440 | | | −36.3738 |
| S3 | Aspheric | 2.8632 | 0.2400 | 1.67 | 20.4 | −47.9349 |
| S4 | Aspheric | 1.8115 | 0.1222 | | | −5.7266 |
| S5 | Aspheric | 2.2244 | 0.4500 | 1.55 | 64.1 | −2.6590 |
| S6 | Aspheric | 6.1156 | 0.5741 | | | 8.8760 |
| S7 | Aspheric | 1000.0000 | 0.2600 | 1.67 | 20.4 | −99.0000 |
| S8 | Aspheric | −2740.9276 | 0.0958 | | | 99.0000 |
| S9 | Aspheric | 59.9214 | 0.2700 | 1.67 | 20.4 | 99.0000 |
| S10 | Aspheric | 9.6271 | 0.1463 | | | −14.0676 |
| S11 | Aspheric | 1.9899 | 0.2600 | 1.66 | 21.5 | −16.9511 |
| S12 | Aspheric | 1.9314 | 0.1328 | | | −16.5467 |
| S13 | Aspheric | 4.0795 | 0.5400 | 1.55 | 64.1 | 0.1017 |
| S14 | Aspheric | −5.0796 | 0.2678 | | | −37.2450 |
| S15 | Aspheric | 2.7431 | 0.3375 | 1.55 | 64.1 | −14.5512 |
| S16 | Aspheric | 1.1493 | 0.2213 | | | −5.6182 |
| S17 | Spherical | Infinite | 0.1100 | 1.52 | 64.1 | |
| S18 | Spherical | Infinite | 0.5892 | | | |
| S19 | Spherical | Infinite | | | | |

TABLE 23

| Surface number | A4 | A6 | A8 | A10 | A12 |
|---|---|---|---|---|---|
| S1 | 7.8111E−03 | −2.3670E−03 | 1.0356E−02 | −1.8298E−02 | 1.6955E−02 |
| S2 | 2.3553E−02 | −1.1093E−02 | −2.1294E−02 | 2.0458E−02 | −6.0502E−03 |
| S3 | 1.1073E−01 | −2.0489E−01 | 2.1367E−01 | −1.8674E−01 | 1.3134E−01 |
| S4 | −4.7610E−02 | 2.0345E−01 | −4.3405E−01 | 5.4308E−01 | −4.4587E−01 |
| S5 | −5.4512E−02 | 1.6139E−01 | −3.1019E−01 | 4.1477E−01 | −3.9741E−01 |
| S6 | −1.7933E−02 | 7.4115E−03 | −1.0941E−02 | 1.5634E−02 | −2.7033E−02 |
| S7 | −1.7629E−02 | −7.0626E−02 | 1.3124E−01 | −2.1800E−01 | 2.2969E−01 |
| S8 | 7.9256E−02 | −4.2217E−01 | 1.0121E+00 | −1.5855E+00 | 1.5757E+00 |
| S9 | 1.0796E−01 | −5.2037E−01 | 1.1804E+00 | −1.6195E+00 | 1.3919E+00 |
| S10 | −1.3754E−02 | −2.4851E−01 | 5.0935E−01 | −5.6428E−01 | 3.7395E−01 |
| S11 | 1.3018E−01 | −2.9289E−01 | 3.3200E−01 | −2.5167E−01 | 1.1722E−01 |
| S12 | 1.3379E−01 | −2.6865E−01 | 2.8585E−01 | −2.0062E−01 | 8.9465E−02 |
| S13 | 8.6423E−03 | −1.0794E−01 | 1.3126E−01 | −8.6585E−02 | 3.2990E−02 |
| S14 | 2.2364E−02 | −5.9853E−02 | 9.2609E−02 | −6.4780E−02 | 2.4959E−02 |
| S15 | −4.0005E−01 | 2.8802E−01 | −1.2829E−01 | 4.2933E−02 | −1.0190E−02 |
| S16 | −2.1455E−01 | 1.6249E−01 | −8.7307E−02 | 3.2860E−02 | −8.5611E−03 |

| Surface number | A14 | A16 | A18 | A20 |
|---|---|---|---|---|
| S1 | −9.2044E−03 | 2.9093E−03 | −5.0125E−04 | 3.5857E−05 |
| S2 | −9.1341E−04 | 1.0769E−03 | −2.7029E−04 | 2.3371E−05 |
| S3 | −6.4923E−02 | 2.0692E−02 | −3.8178E−03 | 3.1045E−04 |
| S4 | 2.4720E−01 | −9.0685E−02 | 2.0220E−02 | −2.0722E−03 |
| S5 | 2.6195E−01 | −1.1624E−01 | 3.1604E−02 | −3.8771E−03 |
| S6 | 2.7063E−02 | −1.9033E−02 | 8.0464E−03 | −1.3855E−03 |
| S7 | −1.4452E−01 | 4.8266E−02 | −6.1372E−03 | −1.7383E−04 |
| S8 | −9.9317E−01 | 3.8346E−01 | −8.2568E−02 | 7.5898E−03 |
| S9 | −7.5751E−01 | 2.5303E−01 | −4.7455E−02 | 3.8428E−03 |
| S10 | −1.4775E−01 | 3.2274E−02 | −3.1464E−03 | 5.0760E−05 |
| S11 | −3.2810E−02 | 4.9579E−03 | −2.5943E−04 | −1.0515E−05 |
| S12 | −2.5007E−02 | 4.2462E−03 | −4.0065E−04 | 1.6122E−05 |
| S13 | −7.4296E−03 | 9.6423E−04 | −6.5308E−05 | 1.7242E−06 |
| S14 | −5.6602E−03 | 7.4981E−04 | −5.3602E−05 | 1.5972E−06 |

TABLE 23-continued

| | | | | |
|---|---|---|---|---|
| S15 | 1.5710E−03 | −1.4688E−04 | 7.5350E−06 | −1.6265E−07 |
| S16 | 1.4880E−03 | −1.6219E−04 | 9.9223E−06 | −2.5820E−07 |

TABLE 24

| | | | |
|---|---|---|---|
| ImgH (mm) | 3.39 | f3 (mm) | 6.14 |
| TTL (mm) | 5.58 | f4 (mm) | 1096.61 |
| HFOV (°) | 37.0 | f5 (mm) | −17.20 |
| f (mm) | 4.34 | f6 (mm) | 131.08 |
| f1 (mm) | 6.23 | f7 (mm) | 4.23 |
| f2 (mm) | −8.12 | f8 (mm) | −3.91 |

Figure 16A:
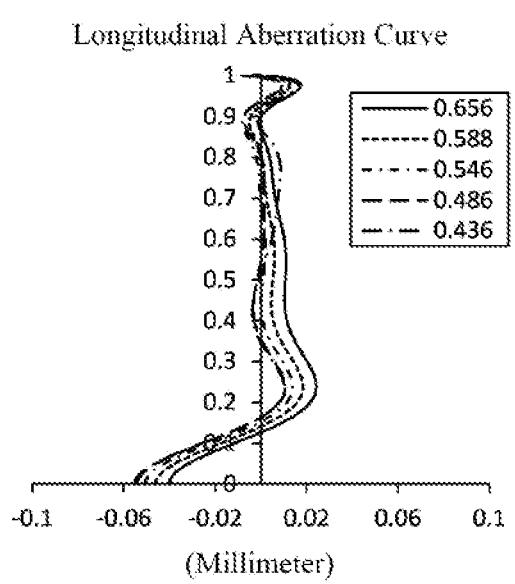
FIGS. 16A to 16D illustrate a longitudinal aberration curve, an astigmatic curve, a distortion curve, and a lateral color curve of the optical imaging lens group of the example 8, respectively.
Figure 16B:
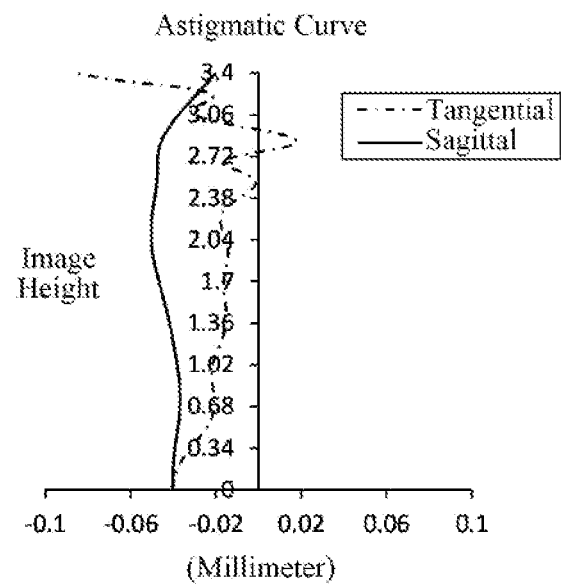
Figure 16C:
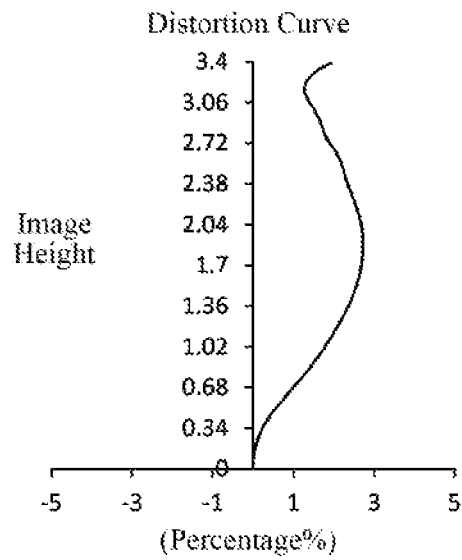
Figure 16D:
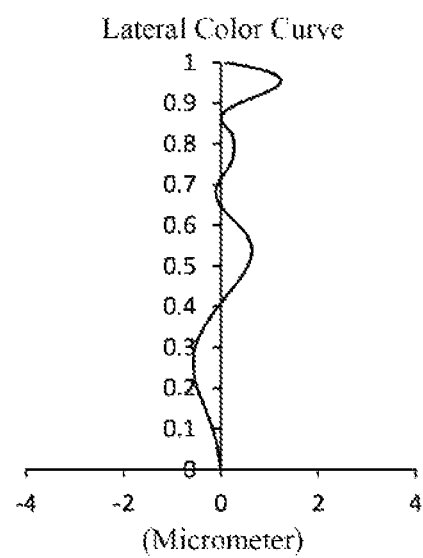

FIG. 16A illustrates a longitudinal aberration curve of the optical imaging lens group according to example 8, representing deviations of focal points converged by light of different wavelengths after passing through the lens group. FIG. 16B illustrates an astigmatic curve of the optical imaging lens group according to example 8, representing a curvature of a tangential plane and a curvature of a sagittal plane. FIG. 16C illustrates a distortion curve of the optical imaging lens group according to example 8, representing amounts of distortion corresponding to different image heights. FIG. 16D illustrates a lateral color curve of the optical imaging lens group according to example 8, representing deviations of different image heights on an imaging plane after light passes through the lens group. It can be seen from FIG. 16A to FIG. 16D that the optical imaging lens group provided in example 8 may achieve good image quality.

EXAMPLE 9

Figure 17:
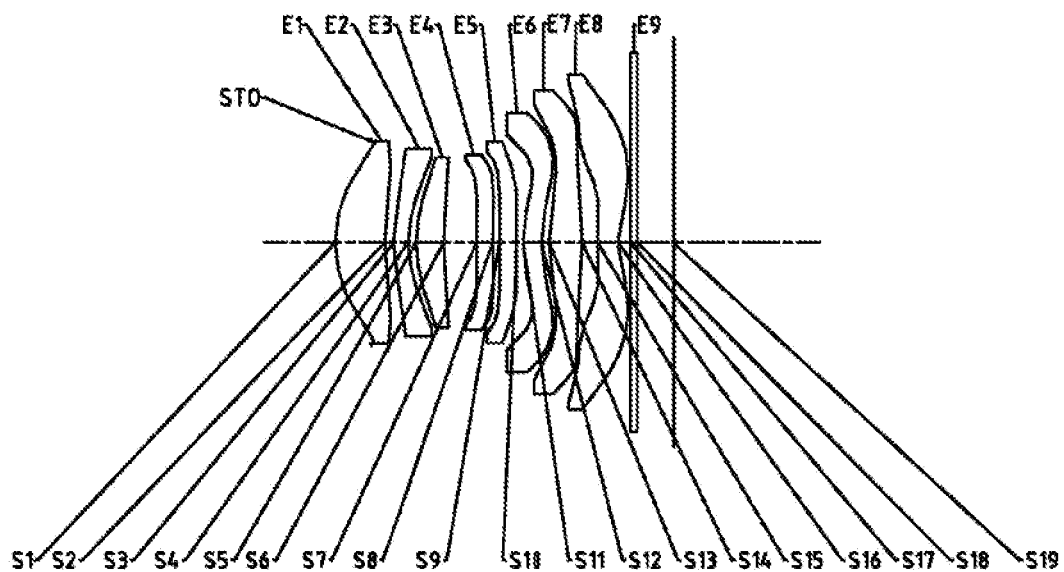
FIG. 17 illustrates a schematic structural view of an optical imaging lens group according to example 9 of the present disclosure.

An optical imaging lens group according to example 9 of the present disclosure is described below with reference to FIG. 17 to FIG. 18D. FIG. 17 shows a schematic structural view of the optical imaging lens group according to example 9 of the present disclosure.

As shown in FIG. 17, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has negative refractive power, an object-side surface S9 thereof is concave, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 25 shows surface type, radius of curvature, thickness, material and conic coefficient of each lens of the optical imaging lens group in example 9, wherein the units for the radius of curvature and the thickness are millimeter (mm). Table 26 shows high-order coefficients applicable to each aspheric surface in example 9, wherein the surface shape of each aspheric surface may be defined by the formula (1) given in the above example 1. Table 27 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 9.

TABLE 25

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.5960 | | | |
| S1 | Aspheric | 2.1677 | 0.8200 | 1.55 | 64.1 | −0.6403 |
| S2 | Aspheric | 5.7056 | 0.1435 | | | −37.7539 |
| S3 | Aspheric | 2.7376 | 0.2400 | 1.67 | 20.4 | −40.9663 |
| S4 | Aspheric | 1.7882 | 0.1353 | | | −5.4652 |
| S5 | Aspheric | 2.4363 | 0.4500 | 1.55 | 64.1 | −2.0319 |
| S6 | Aspheric | 6.7140 | 0.5459 | | | 16.3937 |
| S7 | Aspheric | 16.8936 | 0.2600 | 1.67 | 20.4 | 95.8050 |
| S8 | Aspheric | 14.1728 | 0.1120 | | | 88.1108 |
| S9 | Aspheric | −800.0000 | 0.2800 | 1.67 | 20.4 | −99.0000 |
| S10 | Aspheric | 11.8777 | 0.1068 | | | 15.3521 |
| S11 | Aspheric | 2.2714 | 0.3000 | 1.66 | 21.5 | −17.2675 |
| S12 | Aspheric | 2.0714 | 0.1283 | | | −17.3063 |
| S13 | Aspheric | 3.2360 | 0.5395 | 1.55 | 64.1 | −0.8490 |
| S14 | Aspheric | −7.0861 | 0.2542 | | | −63.0333 |
| S15 | Aspheric | 2.5254 | 0.3375 | 1.55 | 64.1 | −14.9551 |

TABLE 25-continued

| Surface number | Surface type | Radius of curvature | Thickness | Material Refractive index | Material Abbe number | Conic coefficient |
|---|---|---|---|---|---|---|
| S16 | Aspheric | 1.1580 | 0.2083 | | | −5.6278 |
| S17 | Spherical | Infinite | 0.1100 | 1.52 | 64.1 | |
| S18 | Spherical | Infinite | 0.5978 | | | |
| S19 | Spherical | Infinite | | | | |

TABLE 26

| Surface number | A4 | A6 | A8 | A10 | A12 |
|---|---|---|---|---|---|
| S1 | 6.8184E−03 | −3.3108E−03 | 1.2774E−02 | −2.2916E−02 | 2.2011E−02 |
| S2 | 7.0674E−03 | 2.2899E−03 | −1.9307E−02 | 1.2469E−02 | −2.1082E−03 |
| S3 | 9.7935E−02 | −1.9631E−01 | 2.2827E−01 | −2.0758E−01 | 1.3772E−01 |
| S4 | −3.7915E−02 | 1.4567E−01 | −2.7136E−01 | 2.7514E−01 | −1.6108E−01 |
| S5 | −4.7405E−02 | 1.3954E−01 | −2.9086E−01 | 4.1199E−01 | −3.9654E−01 |
| S6 | −1.9179E−02 | −4.5905E−03 | 3.0267E−02 | −8.2492E−02 | 1.2074E−01 |
| S7 | −4.0256E−02 | 2.6843E−02 | −1.2871E−01 | 1.8399E−01 | −1.4826E−01 |
| S8 | 2.0397E−02 | −1.9739E−01 | 5.0384E−01 | −9.0386E−01 | 1.0265E+00 |
| S9 | 7.6479E−02 | −4.1579E−01 | 9.9830E−01 | −1.4860E+00 | 1.4252E+00 |
| S10 | 2.9440E−02 | −3.9707E−01 | 7.4698E−01 | −8.4407E−01 | 6.2060E−01 |
| S11 | 1.1727E−01 | −2.6927E−01 | 3.1374E−01 | −2.7665E−01 | 1.7018E−01 |
| S12 | 5.0543E−02 | −6.1577E−02 | 1.6240E−02 | 5.7151E−03 | −7.1839E−03 |
| S13 | −8.4575E−02 | 3.9484E−02 | −3.4243E−02 | −1.7443E−02 | 1.2092E−02 |
| S14 | −1.1761E−02 | −5.6264E−04 | 4.3577E−02 | −4.6561E−02 | 2.2510E−02 |
| S15 | −4.1058E−01 | 3.2341E−01 | −1.7017E−01 | 6.6799E−02 | −1.7825E−02 |
| S16 | −2.1908E−01 | 1.7128E−01 | −9.7227E−02 | 3.8339E−02 | −1.0365E−02 |

| Surface number | A14 | A16 | A18 | A20 |
|---|---|---|---|---|
| S1 | −1.2504E−02 | 4.1501E−03 | −7.5175E−04 | 5.7014E−05 |
| S2 | −1.1210E−03 | 6.3774E−04 | −1.2325E−04 | 8.4538E−06 |
| S3 | −6.0798E−02 | 1.6945E−02 | −2.7361E−03 | 1.9852E−04 |
| S4 | 4.5030E−02 | 1.2936E−03 | −3.5114E−03 | 5.1903E−04 |
| S5 | 2.4523E−01 | −9.6384E−02 | 2.3275E−02 | −2.7018E−03 |
| S6 | −1.0989E−01 | 5.6831E−02 | −1.4668E−02 | 1.3976E−03 |
| S7 | 6.6234E−02 | −1.5124E−02 | 1.6090E−03 | −1.2425E−04 |
| S8 | −7.3425E−01 | 3.1778E−01 | −7.5697E−02 | 7.6070E−03 |
| S9 | −8.7953E−01 | 3.3421E−01 | −7.0818E−02 | 6.3861E−03 |
| S10 | −2.9538E−01 | 8.6901E−02 | −1.4232E−02 | 9.8630E−04 |
| S11 | −7.0184E−02 | 1.7776E−02 | −2.4023E−03 | 1.2847E−04 |
| S12 | 2.9817E−03 | −6.3890E−04 | 6.9944E−05 | −3.0798E−06 |
| S13 | −3.6606E−03 | 5.7561E−04 | −4.5338E−05 | 1.3888E−06 |
| S14 | −5.9579E−03 | 8.8707E−04 | −6.9713E−05 | 2.2516E−06 |
| S15 | 3.0158E−03 | −3.0760E−04 | 1.7270E−05 | −4.1101E−07 |
| S16 | 1.8603E−03 | −2.0905E−04 | 1.3181E−05 | −3.5348E−07 |

TABLE 27

| ImgH (mm) | 3.39 | f3 (mm) | 6.74 |
|---|---|---|---|
| TTL (mm) | 5.57 | f4 (mm) | −136.94 |
| HFOV (°) | 37.0 | f5 (mm) | −17.51 |
| f (mm) | 4.34 | f6 (mm) | −88.43 |
| f1 (mm) | 5.91 | f7 (mm) | 4.14 |
| f2 (mm) | −8.59 | f8 (mm) | −4.29 |

Figures 18A, 18B:
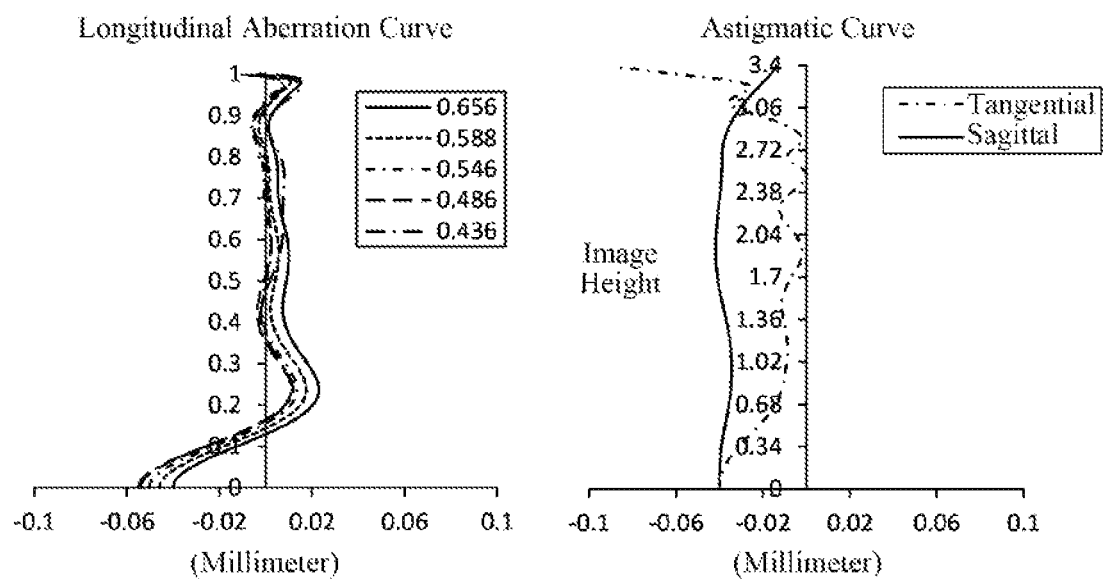
FIGS. 18A to 18D illustrate a longitudinal aberration curve, an astigmatic curve, a distortion curve, and a lateral color curve of the optical imaging lens group of the example 9, respectively.
Figure 18C:
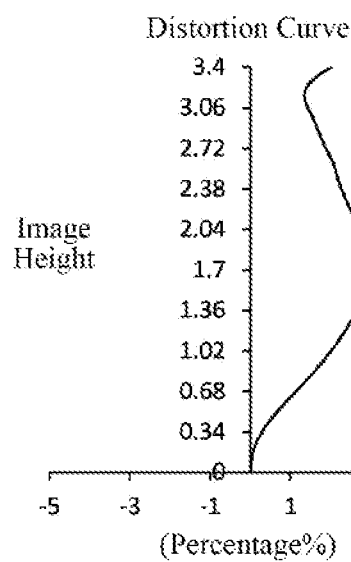
Figure 18D:
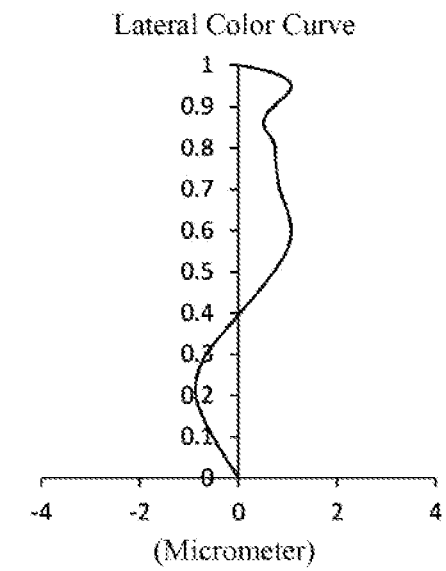

FIG. 18A illustrates a longitudinal aberration curve of the optical imaging lens group according to example 9, representing deviations of focal points converged by light of different wavelengths after passing through the lens group. FIG. 18B illustrates an astigmatic curve of the optical imaging lens group according to example 9, representing a curvature of a tangential plane and a curvature of a sagittal plane. FIG. 18C illustrates a distortion curve of the optical imaging lens group according to example 9, representing amounts of distortion corresponding to different image heights. FIG. 18D illustrates a lateral color curve of the optical imaging lens group according to example 9, representing deviations of different image heights on an imaging plane after light passes through the lens group. It can be seen from FIG. 18A to FIG. 18D that the optical imaging lens group provided in example 9 may achieve good image quality.

EXAMPLE 10

Figure 19:
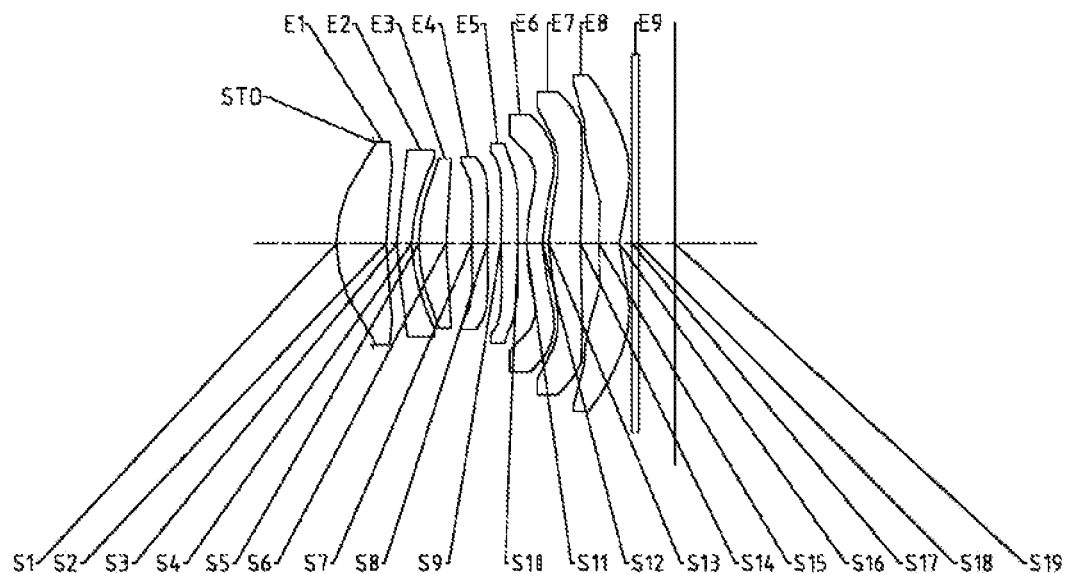
FIG. 19 illustrates a schematic structural view of an optical imaging lens group according to example 10 of the present disclosure.

An optical imaging lens group according to example 10 of the present disclosure is described below with reference to FIG. 19 to FIG. 20D. FIG. 19 shows a schematic structural view of the optical imaging lens group according to example 10 of the present disclosure.

As shown in FIG. 19, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is concave. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 28 shows surface type, radius of curvature, thickness, material and conic coefficient of each lens of the optical imaging lens group in example 10, wherein the units for the radius of curvature and the thickness are millimeter (mm). Table 29 shows high-order coefficients applicable to each aspheric surface in example 10, wherein the surface shape of each aspheric surface may be defined by the formula (1) given in the above example 1. Table 30 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 10.

TABLE 28

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5960 | | | |
| S1 | Aspheric | 2.1533 | 0.8200 | 1.55 | 64.1 | −0.6701 |
| S2 | Aspheric | 5.6207 | 0.1711 | | | −38.7572 |
| S3 | Aspheric | 2.9965 | 0.2400 | 1.67 | 20.4 | −47.4114 |
| S4 | Aspheric | 1.8743 | 0.1217 | | | −5.4964 |
| S5 | Aspheric | 2.5026 | 0.4500 | 1.55 | 64.1 | −1.9854 |
| S6 | Aspheric | 6.8048 | 0.4181 | | | 16.7037 |
| S7 | Aspheric | 16.9465 | 0.2600 | 1.67 | 20.4 | 99.0000 |
| S8 | Aspheric | 16.2578 | 0.2210 | | | 92.0821 |
| S9 | Aspheric | 14.4658 | 0.2712 | 1.67 | 20.4 | 82.3501 |
| S10 | Aspheric | 10.3112 | 0.1444 | | | 8.1606 |
| S11 | Aspheric | 2.7278 | 0.2600 | 1.66 | 21.5 | −11.0966 |
| S12 | Aspheric | 2.0677 | 0.1083 | | | −12.7030 |
| S13 | Aspheric | 2.3070 | 0.5210 | 1.55 | 64.1 | −2.1793 |
| S14 | Aspheric | 50.0000 | 0.2966 | | | 99.0000 |
| S15 | Aspheric | 2.1572 | 0.3375 | 1.55 | 64.1 | −14.3749 |
| S16 | Aspheric | 1.1543 | 0.2070 | | | −6.0254 |
| S17 | Spherical | Infinite | 0.1100 | 1.52 | 64.1 | |
| S18 | Spherical | Infinite | 0.5965 | | | |
| S19 | Spherical | Infinite | | | | |

TABLE 29

| Surface number | A4 | A6 | A8 | A10 | A12 |
|---|---|---|---|---|---|
| S1 | 6.5605E−03 | 1.2294E−03 | 8.6846E−04 | −5.3794E−03 | 6.6646E−03 |
| S2 | 1.5706E−02 | −1.7764E−02 | 1.0481E−02 | −1.9029E−02 | 2.0510E−02 |
| S3 | 8.6117E−02 | −1.6026E−01 | 1.2968E−01 | −4.8271E−02 | −1.7546E−02 |
| S4 | −4.3195E−02 | 1.8366E−01 | −4.1745E−01 | 5.7378E−01 | −5.2109E−01 |
| S5 | −4.6786E−02 | 1.2623E−01 | −2.0790E−01 | 1.7810E−01 | −3.7632E−02 |
| S6 | −1.3239E−02 | −5.1957E−02 | 1.9779E−01 | −4.3170E−01 | 5.6973E−01 |
| S7 | −3.4788E−02 | 2.5601E−02 | −1.4809E−01 | 2.4333E−01 | −2.3429E−01 |
| S8 | −1.3595E−02 | −4.8344E−02 | 9.4342E−02 | −1.9556E−01 | 2.4739E−01 |
| S9 | −9.3660E−04 | −1.7024E−01 | 3.5747E−01 | −4.0319E−01 | 2.6897E−01 |
| S10 | 6.8861E−02 | −5.2583E−01 | 9.4977E−01 | −1.0288E+00 | 7.2757E−01 |
| S11 | 1.5460E−01 | −4.1307E−01 | 5.3006E−01 | −4.7711E−01 | 2.9673E−01 |
| S12 | 4.2583E−02 | −7.2682E−02 | 2.6075E−02 | 9.5163E−03 | −1.3766E−02 |
| S13 | −1.4494E−01 | 1.2956E−01 | −7.9859E−02 | 2.1790E−02 | −7.5518E−04 |
| S14 | −5.3791E−02 | 8.2579E−02 | −2.5583E−02 | −1.7471E−02 | 1.5814E−02 |
| S15 | −4.0885E−01 | 3.3535E−01 | −1.7686E−01 | 6.8174E−02 | −1.7946E−02 |
| S16 | −2.0809E−01 | 1.5466E−01 | −8.1392E−02 | 2.9131E−02 | −7.1692E−03 |

| Surface number | A14 | A16 | A18 | A20 |
|---|---|---|---|---|
| S1 | −4.3427E−03 | 1.5604E−03 | −3.0339E−04 | 2.4491E−05 |
| S2 | −1.1850E−02 | 3.8392E−03 | −6.6499E−04 | 4.7935E−05 |

TABLE 29-continued

| | | | | |
|---|---|---|---|---|
| S3 | 3.2964E−02 | −1.7309E−02 | 4.1854E−03 | −3.9453E−04 |
| S4 | 3.1326E−01 | −1.2014E−01 | 2.7088E−02 | −2.7618E−03 |
| S5 | −7.5050E−02 | 6.9698E−02 | −2.3276E−02 | 2.7943E−03 |
| S6 | −4.7006E−01 | 2.3256E−01 | −6.2606E−02 | 7.0716E−03 |
| S7 | 1.3063E−01 | −3.9597E−02 | 5.3062E−03 | −8.5947E−05 |
| S8 | −1.9753E−01 | 9.5781E−02 | −2.5555E−02 | 2.8725E−03 |
| S9 | −1.0700E−01 | 2.1489E−02 | −6.7214E−04 | −3.0921E−04 |
| S10 | −3.3792E−01 | 9.8672E−02 | −1.6266E−02 | 1.1460E−03 |
| S11 | −1.2466E−01 | 3.2788E−02 | −4.7445E−03 | 2.8385E−04 |
| S12 | 5.8439E−03 | −1.2317E−03 | 1.3044E−04 | −5.5208E−06 |
| S13 | −9.1599E−04 | 2.0161E−04 | −1.5624E−05 | 3.3747E−07 |
| S14 | −5.1693E−03 | 8.5884E−04 | −7.2332E−05 | 2.4542E−06 |
| S15 | 3.0190E−03 | −3.0754E−04 | 1.7270E−05 | −4.1101E−07 |
| S16 | 1.2028E−03 | −1.3036E−04 | 8.1146E−06 | −2.1777E−07 |

TABLE 30

| | | | |
|---|---|---|---|
| ImgH (mm) | 3.39 | f3 (mm) | 6.98 |
| TTL (mm) | 5.55 | f4 (mm) | −705.36 |
| HFOV (°) | 37.1 | f5 (mm) | −55.18 |
| f (mm) | 4.32 | f6 (mm) | −15.40 |
| f1 (mm) | 5.89 | f7 (mm) | 4.41 |
| f2 (mm) | −8.19 | f8 (mm) | −5.16 |

Figure 20A:
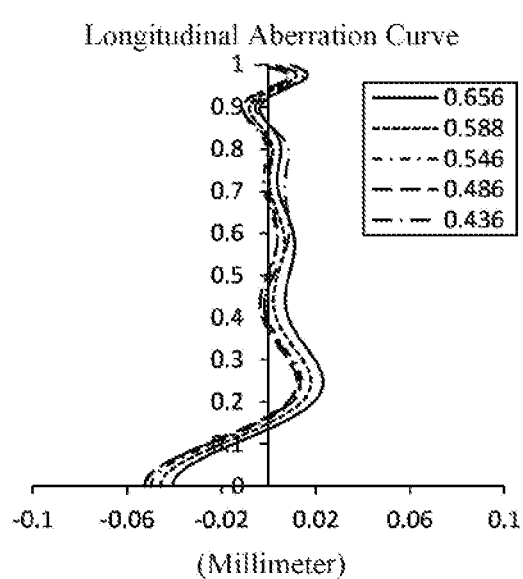
FIGS. 20A to 20D illustrate a longitudinal aberration curve, an astigmatic curve, a distortion curve, and a lateral color curve of the optical imaging lens group of the example 10, respectively.
Figure 20B:
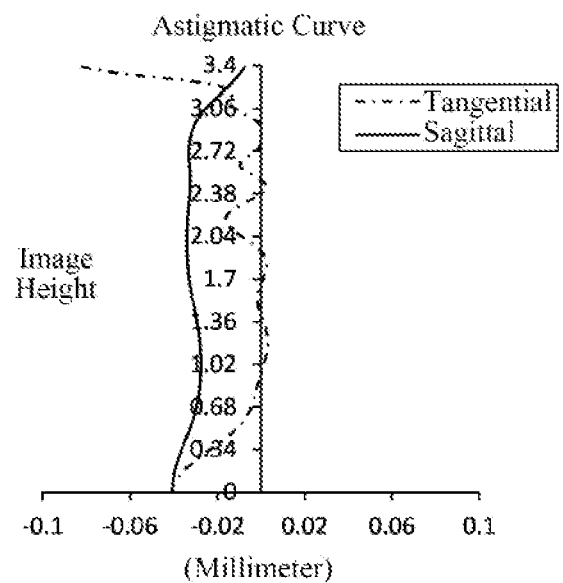
Figure 20C:
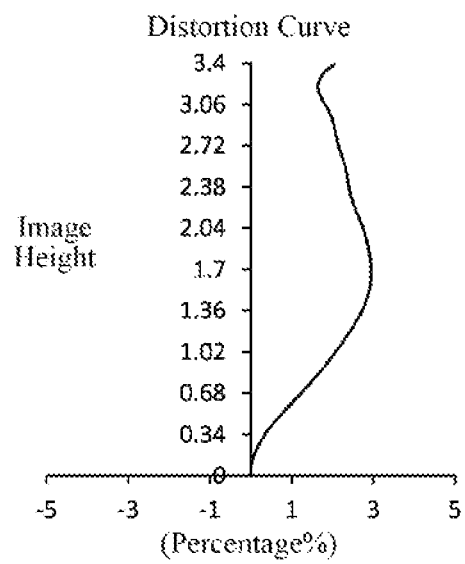
Figure 20D:
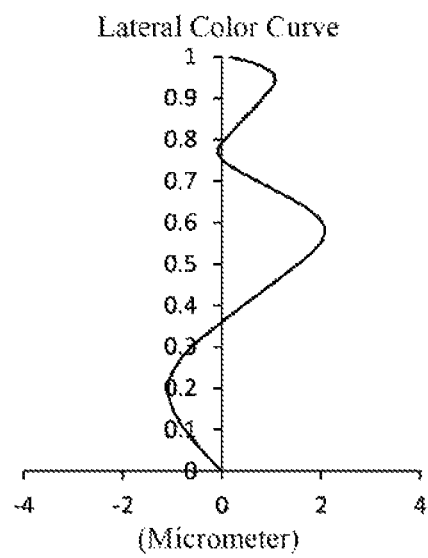

FIG. 20A illustrates a longitudinal aberration curve of the optical imaging lens group according to example 10, representing deviations of focal points converged by light of different wavelengths after passing through the lens group. FIG. 20B illustrates an astigmatic curve of the optical imaging lens group according to example 10, representing a curvature of a tangential plane and a curvature of a sagittal plane. FIG. 20C illustrates a distortion curve of the optical imaging lens group according to example 10, representing amounts of distortion corresponding to different image heights. FIG. 20D illustrates a lateral color curve of the optical imaging lens group according to example 10, representing deviations of different image heights on an imaging plane after light passes through the lens group. It can be seen from FIG. 20A to FIG. 20D that the optical imaging lens group provided in example 10 may achieve good image quality.

EXAMPLE 11

Figure 21:
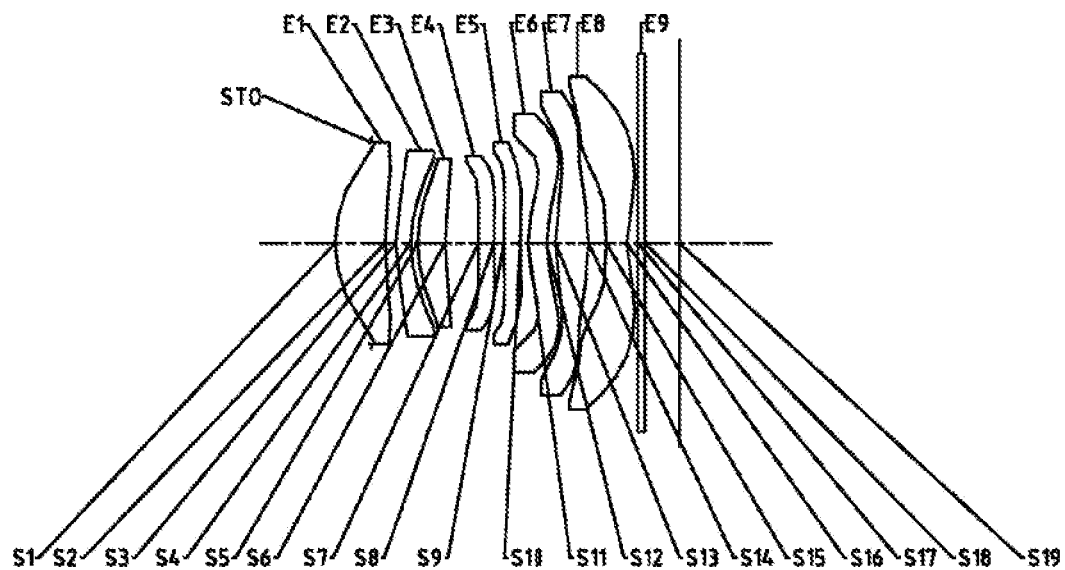
FIG. 21 illustrates a schematic structural view of an optical imaging lens group according to example 11 of the present disclosure.

An optical imaging lens group according to example 11 of the present disclosure is described below with reference to FIG. 21 to FIG. 22D. FIG. 21 shows a schematic structural view of the optical imaging lens group according to example 11 of the present disclosure.

As shown in FIG. 21, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is convex, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is concave, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 31 shows surface type, radius of curvature, thickness, material and conic coefficient of each lens of the optical imaging lens group in example 11, wherein the units for the radius of curvature and the thickness are millimeter (mm). Table 32 shows high-order coefficients applicable to each aspheric surface in example 11, wherein the surface shape of each aspheric surface may be defined by the formula (1) given in the above example 1. Table 33 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 11.

TABLE 31

| | | | | Material | | |
|---|---|---|---|---|---|---|
| Surface number | Surface type | Radius of curvature | Thickness | Refractive index | Abbe number | Conic coefficient |
| OBJ | Spherical | Infinite | Infinite | | | |
| STO | Spherical | Infinite | −0.5960 | | | |
| S1 | Aspheric | 2.2073 | 0.8200 | 1.55 | 64.1 | −0.5940 |
| S2 | Aspheric | 6.3462 | 0.1748 | | | −33.4272 |
| S3 | Aspheric | 3.0606 | 0.2400 | 1.67 | 20.4 | −37.3270 |

TABLE 31-continued

| Surface number | Surface type | Radius of curvature | Thickness | Material Refractive index | Abbe number | Conic coefficient |
|---|---|---|---|---|---|---|
| S4 | Aspheric | 1.8721 | 0.1227 | | | −5.0408 |
| S5 | Aspheric | 2.4444 | 0.4492 | 1.55 | 64.1 | −1.7791 |
| S6 | Aspheric | 6.3214 | 0.5461 | | | 15.9202 |
| S7 | Aspheric | 23.2549 | 0.2600 | 1.67 | 20.4 | 80.3304 |
| S8 | Aspheric | 19.4720 | 0.1578 | | | 83.0131 |
| S9 | Aspheric | 14.6950 | 0.2708 | 1.67 | 20.4 | 80.4165 |
| S10 | Aspheric | 8.3219 | 0.1317 | | | 8.3152 |
| S11 | Aspheric | 2.5482 | 0.3000 | 1.66 | 21.5 | −10.5603 |
| S12 | Aspheric | 2.1712 | 0.1492 | | | −16.2022 |
| S13 | Aspheric | 3.2880 | 0.5400 | 1.55 | 64.1 | −0.7333 |
| S14 | Aspheric | −3.4711 | 0.2910 | | | −29.1052 |
| S15 | Aspheric | −1000.0000 | 0.3375 | 1.55 | 64.1 | −99.0000 |
| S16 | Aspheric | 1.6522 | 0.1856 | | | −8.3232 |
| S17 | Spherical | Infinite | 0.1100 | 1.52 | 64.1 | |
| S18 | Spherical | Infinite | 0.5734 | | | |
| S19 | Spherical | Infinite | | | | |

TABLE 32

| Surface number | A4 | A6 | A8 | A10 | A12 |
|---|---|---|---|---|---|
| S1 | 7.8163E−03 | −9.1148E−03 | 2.1327E−02 | −2.8386E−02 | 2.2402E−02 |
| S2 | 8.5771E−03 | −1.3733E−03 | −1.9688E−02 | 2.1130E−02 | −1.2334E−02 |
| S3 | 7.1932E−02 | −1.2763E−01 | 1.1003E−01 | −6.9737E−02 | 3.1539E−02 |
| S4 | −2.4427E−02 | 1.1350E−01 | −2.6163E−01 | 3.5118E−01 | −3.1485E−01 |
| S5 | −3.1590E−02 | 6.1999E−02 | −6.6199E−02 | 2.9417E−01 | 7.4625E−02 |
| S6 | −1.9581E−02 | −7.1753E−03 | 3.5799E−02 | −9.2040E−02 | 1.3178E−01 |
| S7 | −3.4827E−02 | 3.4242E−02 | −1.5269E−01 | 2.3441E−01 | −2.2303E−01 |
| S8 | −8.4264E−03 | −5.2244E−02 | 1.0102E−01 | −2.0159E−01 | 2.4723E−01 |
| S9 | 2.5759E−02 | −2.5960E−01 | 5.2553E−01 | −6.1423E−01 | 4.4670E−01 |
| S10 | 7.8165E−02 | −5.3277E−01 | 9.3291E−01 | −9.8255E−01 | 6.7014E−01 |
| S11 | 1.1038E−01 | −2.9288E−01 | 3.5901E−01 | −2.9122E−01 | 1.5104E−01 |
| S12 | 5.3386E−02 | −9.5660E−02 | 8.1930E−02 | −4.6995E−02 | 1.6036E−02 |
| S13 | −9.6582E−02 | 4.6475E−02 | −1.7897E−02 | 5.4860E−03 | −3.3171E−03 |
| S14 | −2.0166E−02 | −1.4770E−02 | 3.4171E−02 | −2.8689E−02 | 1.3287E−02 |
| S15 | −2.6126E−01 | 1.8217E−01 | −1.0043E−01 | 4.7343E−02 | −1.4753E−02 |
| S16 | −1.4750E−01 | 1.0771E−01 | −6.3118E−02 | 2.6521E−02 | −7.5761E−03 |

| Surface number | A14 | A16 | A18 | A20 |
|---|---|---|---|---|
| S1 | −1.0943E−02 | 3.2137E−03 | −5.2564E−04 | 3.6490E−05 |
| S2 | 4.6027E−03 | −1.1270E−03 | 1.6833E−04 | −1.1922E−05 |
| S3 | −7.5430E−03 | 1.0935E−04 | 3.3347E−04 | −4.8977E−05 |
| S4 | 1.9083E−01 | −7.5256E−02 | 1.7698E−02 | −1.8826E−03 |
| S5 | −9.4725E−02 | 5.3388E−02 | −1.4070E−02 | 1.4037E−03 |
| S6 | −1.1798E−01 | 6.1358E−02 | −1.6753E−02 | 1.8710E−03 |
| S7 | 1.3502E−01 | −5.2188E−02 | 1.2066E−02 | −1.2682E−03 |
| S8 | −1.8801E−01 | 8.5137E−02 | −2.0927E−02 | 2.1538E−03 |
| S9 | −2.0289E−01 | 5.3209E−02 | −6.6194E−03 | 1.8897E−04 |
| S10 | −2.9594E−01 | 8.0991E−02 | −1.2368E−02 | 7.9950E−04 |
| S11 | −4.9447E−02 | 9.2790E−03 | −7.7246E−04 | 7.2252E−06 |
| S12 | −3.1899E−03 | 3.6174E−04 | −2.2151E−05 | 6.2891E−07 |
| S13 | 1.6389E−03 | −4.1523E−04 | 5.0730E−05 | −2.4004E−06 |
| S14 | −3.6025E−03 | 5.6199E−04 | −4.6548E−05 | 1.5839E−06 |
| S15 | 2.7608E−03 | −2.9898E−04 | 1.7270E−05 | −4.1101E−07 |
| S16 | 1.4050E−03 | −1.6000E−04 | 1.0097E−05 | −2.6907E−07 |

TABLE 33

| ImgH (mm) | 3.39 | f3 (mm) | 7.49 |
|---|---|---|---|
| TTL (mm) | 5.72 | f4 (mm) | −6504.20 |
| HFOV (°) | 36.5 | f5 (mm) | −19.04 |
| f (mm) | 4.44 | f6 (mm) | −147.35 |
| f1 (mm) | 4.91 | f7 (mm) | 4.83 |
| f2 (mm) | −6.56 | f8 (mm) | −4.62 |

Figures 22A, 22B:
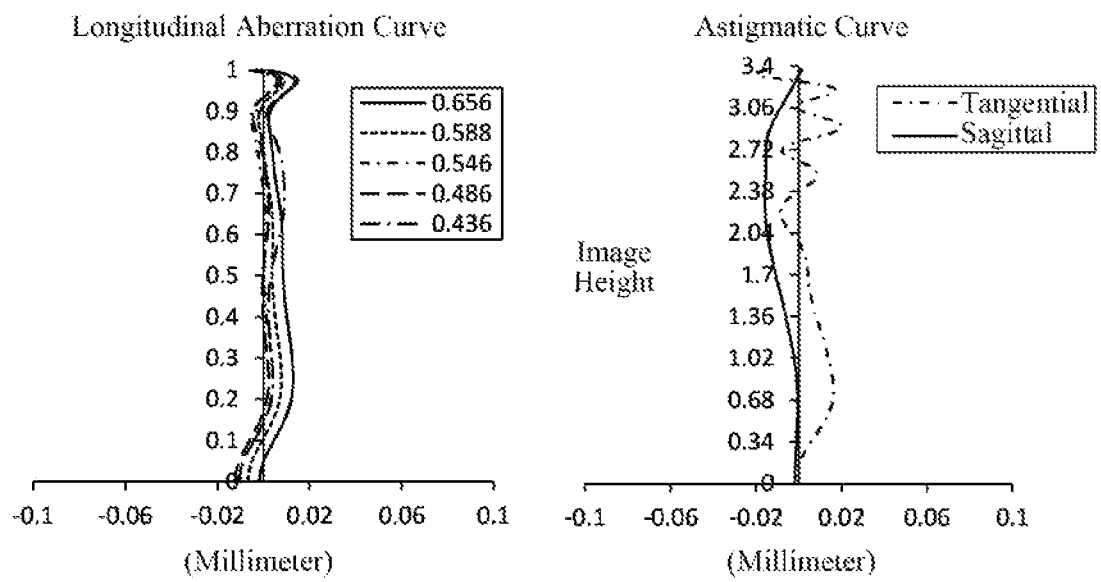
FIGS. 22A to 22D illustrate a longitudinal aberration curve, an astigmatic curve, a distortion curve, and a lateral color curve of the optical imaging lens group of the example 11, respectively.
Figure 22C:
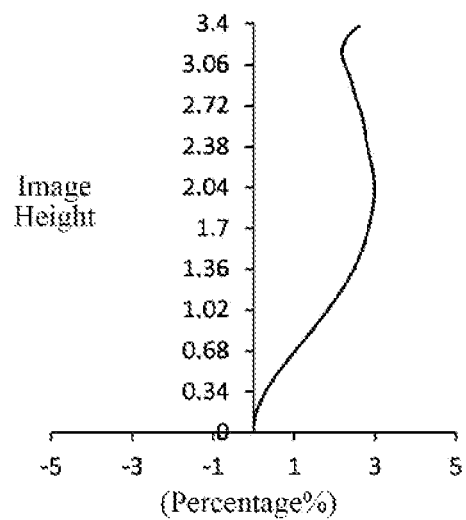
Figure 22D:
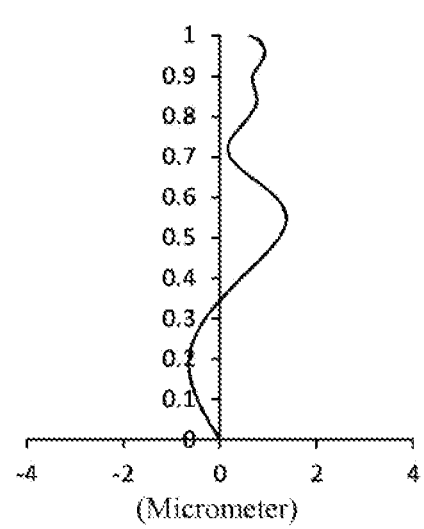

FIG. 22A illustrates a longitudinal aberration curve of the optical imaging lens group according to example 11, representing deviations of focal points converged by light of different wavelengths after passing through the lens group. FIG. 22B illustrates an astigmatic curve of the optical imaging lens group according to example 11, representing a curvature of a tangential plane and a curvature of a sagittal plane. FIG. 22C illustrates a distortion curve of the optical imaging lens group according to example 11, representing amounts of distortion corresponding to different image heights. FIG. 22D illustrates a lateral color curve of the optical imaging lens group according to example 11, representing deviations of different image heights on an imaging plane after light passes through the lens group. It can be seen from FIG. 22A to FIG. 22D that the optical imaging lens group provided in example 11 may achieve good image quality.

EXAMPLE 12

Figure 23:
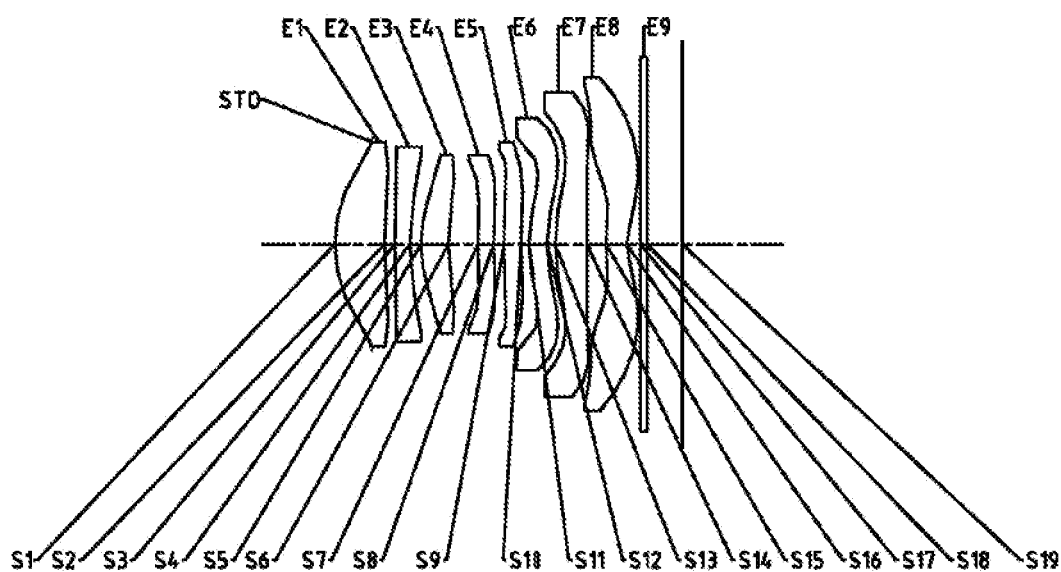
FIG. 23 illustrates a schematic structural view of an optical imaging lens group according to example 12 of the present disclosure.

An optical imaging lens group according to example 12 of the present disclosure is described below with reference to FIG. 23 to FIG. 24D. FIG. 23 shows a schematic structural view of the optical imaging lens group according to example 12 of the present disclosure.

As shown in FIG. 23, the optical imaging lens group according to an exemplary embodiment of the present disclosure includes a stop STO, a first lens E1, a second lens E2, a third lens E3, a fourth lens E4, a fifth lens E5, a sixth lens E6, a seventh lens E7, an eighth lens E8, an optical filter E9 and an imaging plane S19, which are sequentially arranged from an object side to an image side along an optical axis.

The first lens E1 has positive refractive power, an object-side surface S1 thereof is convex, and an image-side surface S2 thereof is concave. The second lens E2 has negative refractive power, an object-side surface S3 thereof is concave, and an image-side surface S4 thereof is concave. The third lens E3 has positive refractive power, an object-side surface S5 thereof is convex, and an image-side surface S6 thereof is concave. The fourth lens E4 has negative refractive power, an object-side surface S7 thereof is convex, and an image-side surface S8 thereof is concave. The fifth lens E5 has negative refractive power, an object-side surface S9 thereof is convex, and an image-side surface S10 thereof is concave. The sixth lens E6 has negative refractive power, an object-side surface S11 thereof is convex, and an image-side surface S12 thereof is concave. The seventh lens E7 has positive refractive power, an object-side surface S13 thereof is convex, and an image-side surface S14 thereof is convex. The eighth lens E8 has negative refractive power, an object-side surface S15 thereof is convex, and an image-side surface S16 thereof is concave. The optical filter E9 has an object-side surface S17 and an image-side surface S18. Light from an object sequentially passes through the respective surfaces S1 to S18 and is finally imaged on the imaging plane S19.

Table 34 shows surface type, radius of curvature, thickness, material and conic coefficient of each lens of the optical imaging lens group in example 12, wherein the units for the radius of curvature and the thickness are millimeter (mm). Table 35 shows high-order coefficients applicable to each aspheric surface in example 12, wherein the surface shape of each aspheric surface may be defined by the formula (1) given in the above example 1. Table 36 shows half of a diagonal length ImgH of an effective pixel area on the imaging plane S19 of the optical imaging lens group, a total optical length TTL, half of a maximal field-of-view HFOV, a total effective focal length f of the optical imaging lens group, and effective focal lengths f1 to f8 of respective lens in example 12.

TABLE 34

| Surface number | Surface type | Radius of curvature | Thickness | Material Refractive index | Abbe number | Conic coefficient |
|---|---|---|---|---|---|---|
| OBJ | Spherical | Infinite | Infinite | | | |
| STO | Spherical | Infinite | −0.5960 | | | |
| S1 | Aspheric | 2.2885 | 0.8200 | 1.55 | 64.1 | −0.7050 |
| S2 | Aspheric | 13.6100 | 0.1699 | | | 14.8805 |
| S3 | Aspheric | −1000.0000 | 0.2400 | 1.67 | 20.4 | 99.0000 |
| S4 | Aspheric | 4.4007 | 0.1889 | | | −6.9952 |
| S5 | Aspheric | 2.2520 | 0.4499 | 1.55 | 64.1 | −3.1385 |
| S6 | Aspheric | 4.6491 | 0.4859 | | | 2.3976 |
| S7 | Aspheric | 13.9421 | 0.2600 | 1.67, | 20.4 | 81.5523 |
| S8 | Aspheric | 13.7937 | 0.1662 | | | 71.5209 |
| S9 | Aspheric | 14.7928 | 0.2783 | 1.67 | 20.4 | 77.9464 |
| S10 | Aspheric | 6.7878 | 0.1321 | | | 10.1968 |
| S11 | Aspheric | 2.8227 | 0.3000 | 1.66 | 21.5 | −10.5653 |
| S12 | Aspheric | 2.6271 | 0.1344 | | | −22.5015 |
| S13 | Aspheric | 3.0068 | 0.5195 | 1.55 | 64.1 | −0.8261 |
| S14 | Aspheric | −20.1646 | 0.3166 | | | −98.8206 |
| S15 | Aspheric | 2.2369 | 0.3375 | 1.55 | 64.1 | −11.2347 |
| S16 | Aspheric | 1.1233 | 0.2256 | | | −5.3102 |
| S17 | Spherical | Infinite | 0.1100 | 1.52 | 64.1 | |
| S18 | Spherical | Infinite | 0.5804 | | | |
| S19 | Spherical | Infinite | | | | |

TABLE 35

| Surface number | A4 | A6 | A8 | A10 | A12 |
|---|---|---|---|---|---|
| S1 | −2.1385E−05 | 2.0925E−02 | −4.9310E−02 | 6.5842E−02 | −5.4700E−02 |
| S2 | 3.8878E−02 | −4.8492E−02 | 2.9907E−02 | −2.0734E−02 | 1.2134E−02 |
| S3 | 8.9207E−02 | −1.3848E−01 | 1.3479E−01 | −1.1587E−01 | 7.9107E−02 |
| S4 | 4.1963E−02 | −1.1005E−01 | 1.4816E−01 | −1.6876E−01 | 1.4319E−01 |
| S5 | −1.5779E−02 | 3.4352E−03 | 2.4596E−02 | −9.3304E−02 | 1.3401E−01 |
| S6 | −1.5773E−02 | −3.8512E−02 | 1.2570E−01 | −2.6047E−01 | 3.0951E−01 |
| S7 | −2.3757E−02 | −2.8912E−02 | −1.7303E−03 | −2.0279E−02 | 8.0098E−02 |
| S8 | 1.9864E−02 | −1.2218E−01 | 2.2598E−01 | −3.4224E−01 | 3.5309E−01 |
| S9 | 1.3279E−02 | −1.6049E−01 | 3.6046E−01 | −4.1413E−01 | 2.6904E−01 |

TABLE 35-continued

| | | | | | |
|---|---|---|---|---|---|
| S10 | 3.1771E−02 | −4.2288E−01 | 8.3232E−01 | −9.1503E−01 | 6.2459E−01 |
| S11 | 1.4023E−01 | −4.2535E−01 | 5.7208E−01 | −4.7526E−01 | 2.4802E−01 |
| S12 | 1.5072E−01 | −3.2051E−01 | 3.3739E−01 | −2.2053E−01 | 9.0419E−02 |
| S13 | −3.2234E−02 | −2.9268E−02 | 4.8856E−02 | −3.6329E−02 | 1.1857E−02 |
| S14 | −2.6870E−02 | 4.4578E−02 | 6.2172E−03 | −2.9571E−02 | 1.7532E−02 |
| S15 | −4.2747E−01 | 3.4878E−01 | −1.8491E−01 | 7.1008E−02 | −1.8451E−02 |
| S16 | −2.2242E−01 | 1.7948E−01 | −1.0125E−01 | 3.9367E−02 | −1.0452E−02 |

| Surface number | A14 | A16 | A18 | A20 |
|---|---|---|---|---|
| S1 | 2.8227E−02 | −8.8123E−03 | 1.5151E−03 | −1.1000E−04 |
| S2 | −4.5086E−03 | 9.0770E−04 | −7.2478E−05 | −1.0284E−06 |
| S3 | −3.7390E−02 | 1.1294E−02 | −1.9466E−03 | 1.4444E−04 |
| S4 | −8.1617E−02 | 2.9190E−02 | −5.8479E−03 | 4.9647E−04 |
| S5 | −1.0939E−01 | 5.1438E−02 | −1.2725E−02 | 1.2835E−03 |
| S6 | −2.2891E−01 | 1.0265E−01 | −2.5225E−02 | 2.6009E−03 |
| S7 | −1.0106E−01 | 6.0815E−02 | −1.7680E−02 | 1.9906E−03 |
| S8 | −2.3614E−01 | 9.6720E−02 | −2.1838E−02 | 2.0716E−03 |
| S9 | −9.4820E−02 | 1.2512E−02 | 1.6972E−03 | −5.0447E−04 |
| S10 | −2.6870E−02 | 7.0199E−02 | −1.0070E−02 | 6.0274E−04 |
| S11 | −8.1089E−02 | 1.5214E−02 | −1.2791E−03 | 1.2975E−05 |
| S12 | −2.3222E−02 | 3.6256E−03 | −3.1541E−04 | 1.1789E−05 |
| S13 | −1.0644E−03 | −3.0509E−04 | 7.8926E−05 | −5.1890E−06 |
| S14 | −5.0035E−03 | 7.7447E−04 | −6.2460E−05 | 2.0594E−05 |
| S15 | 3.0627E−03 | −3.0902E−04 | 1.7270E−05 | −4.1101E−07 |
| S16 | 1.8390E−03 | −2.0270E−04 | 1.2561E−05 | −3.3187E−07 |

TABLE 26

| | | | |
|---|---|---|---|
| ImgH (mm) | 3.38 | f3 (mm) | 7.00 |
| TTL (mm) | 5.66 | f4 (mm) | −184.23 |
| HFOV (°) | 36.1 | f5 (mm) | −29.22 |
| f (mm) | 4.49 | f6 (mm) | −32.62 |

TABLE 26-continued

| | | | |
|---|---|---|---|
| f1 (mm) | 5.79 | f7 (mm) | 3.18 |
| f2 (mm) | −7.85 | f8 (mm) | −3.02 |

Figure 24A:
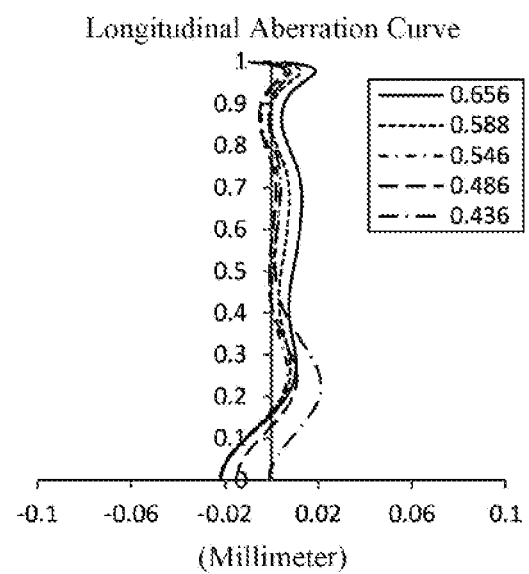
FIGS. 24A to 24D illustrate a longitudinal aberration curve, an astigmatic curve, a distortion curve, and a lateral color curve, and a lateral color curve of the optical imaging lens group of the example 12, respectively.
Figure 24B:
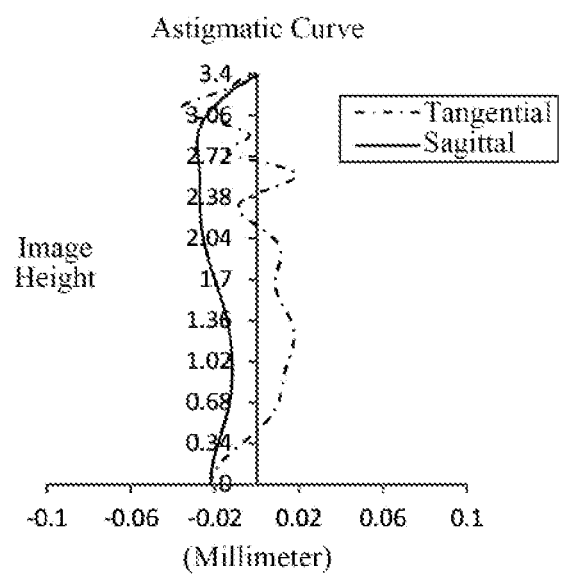
Figure 24C:
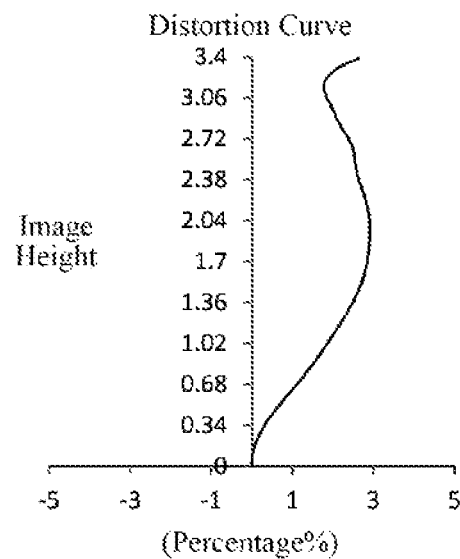
Figure 24D:
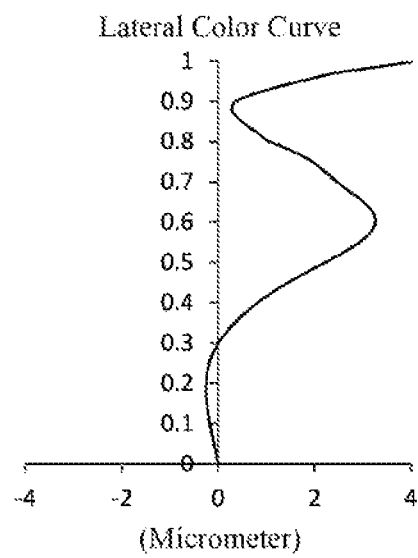

FIG. 24A illustrates a longitudinal aberration curve of the optical imaging lens group according to example 12, representing deviations of focal points converged by light of different wavelengths after passing through the lens group. FIG. 24B illustrates an astigmatic curve of the optical imaging lens group according to example 12, representing a curvature of a tangential plane and a curvature of a sagittal plane. FIG. 24C illustrates a distortion curve of the optical imaging lens group according to example 12, representing amounts of distortion corresponding to different image heights. FIG. 24D illustrates a lateral color curve of the optical imaging lens group according to example 12, representing deviations of different image heights on an imaging plane after light passes through the lens group. It can be seen from FIG. 24A to FIG. 24D that the optical imaging lens group provided in example 12 may achieve good image quality.

In view of the above, examples 1 to 12 respectively satisfy the relationship shown in Table 37.

TABLE 37

| Condition | Example | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| f/EPD | 1.29 | 1.29 | 1.29 | 1.33 | 1.36 | 1.32 | 1.29 | 1.29 | 1.29 | 1.29 | 1.30 | 1.34 |
| f1/ImgH | 1.76 | 1.84 | 1.80 | 1.86 | 1.71 | 1.58 | 1.84 | 1.84 | 1.74 | 1.74 | 1.45 | 1.71 |
| f2/f3 | −1.22 | −1.29 | −1.22 | −1.33 | −1.13 | −1.32 | −1.31 | −1.32 | −1.27 | −1.17 | −0.88 | −1.12 |
| R1/R2 | 0.39 | 0.42 | 0.40 | 0.43 | 0.36 | 0.29 | 0.42 | 0.42 | 0.38 | 0.38 | 0.17 | 0.35 |
| TTL/R5 | 2.25 | 2.48 | 2.36 | 2.42 | 2.29 | 1.25 | 2.51 | 2.51 | 2.29 | 2.22 | 2.54 | 2.32 |
| f456/f123 | −2.42 | −3.13 | −2.42 | −3.49 | −2.82 | −1.95 | −3.66 | −3.70 | −2.49 | −2.23 | −2.60 | −3.08 |
| R11/R12 | 1.23 | 1.13 | 1.37 | 1.03 | 1.17 | 1.21 | 1.04 | 1.03 | 1.10 | 1.32 | 1.07 | 1.17 |
| ECT/EAT | 2.19 | 2.05 | 2.13 | 2.16 | 2.34 | 2.16 | 2.12 | 2.14 | 2.26 | 2.13 | 2.01 | 2.05 |
| CT1/(CT4 + CT5) | 1.55 | 1.58 | 1.53 | 1.42 | 1.53 | 1.50 | 1.58 | 1.55 | 1.52 | 1.54 | 1.52 | 1.54 |
| CT7/CT8 | 1.54 | 1.58 | 1.60 | 1.45 | 1.10 | 1.48 | 1.60 | 1.60 | 1.60 | 1.54 | 1.54 | 1.60 |

The present disclosure further provides an imaging apparatus, having an electronic photosensitive element which may be a photosensitive Charge-Coupled Device (CCD) or a Complementary Metal-Oxide Semiconductor (CMOS). The imaging apparatus may be an independent imaging device such as a digital camera, or may be an imaging module integrated in a mobile electronic device such as a mobile phone. The imaging apparatus is equipped with the optical imaging lens group described above.

The foregoing is only a description of the preferred examples of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical imaging lens group, comprising, sequentially from an object side to an image side along an optical axis, a first lens, a second lens, a third lens, a fourth lens, a fifth lens, a sixth lens, a seventh lens and an eighth lens, wherein,
the first lens has positive refractive power, a convex object-side surface and a concave image-side surface;
the second lens has negative refractive power and a concave image-side surface;
the third lens has positive refractive power and a convex object-side surface;
the fourth lens has negative refractive power;
the fifth lens has refractive power and a concave image-side surface at the paraxial region;
the sixth lens has refractive power, a convex object-side surface and a concave image-side surface at the paraxial region;
the seventh lens has positive refractive power; and
the eighth lens has refractive power,
wherein f/EPD<1.4, where f is a total effective focal length of the optical imaging lens group, and EPD is an entrance pupil diameter of the optical imaging lens group, and 1<CT1/(CT4+CT5)<2, where CT1 is a center thickness of the first lens along the optical axis, CT4 is a center thickness of the fourth lens along the optical axis, and CT5 is a center thickness of the fifth lens along the optical axis.

2. The optical imaging lens group according to claim 1, wherein 1<f1/ImgH<2,
where f1 is an effective focal length of the first lens, and ImgH is half of a diagonal length of an effective pixel area on an imaging plane of the optical imaging lens group.

3. The optical imaging lens group according to claim 1, wherein 0.1<R1/R2<0.5,
where R1 is a radius of curvature of the object-side surface of the first lens, and R2 is a radius of curvature of the image-side surface of the first lens.

4. The optical imaging lens group according to claim 1, wherein −1.5<f2/f3<−0.5,
where f2 is an effective focal length of the second lens, and f3 is an effective focal length of the third lens.

5. The optical imaging lens group according to claim 1, wherein 1<TTL/R5<3,
where TTL is a distance along the optical axis from the object-side surface of the first lens to an imaging plane of the optical imaging lens group, and R5 is a radius of curvature of the object-side surface of the third lens.

6. The optical imaging lens group according to claim 1, wherein 1<R11/R12<1.5,
where R11 is a radius of curvature of the object-side surface of the sixth lens, and R12 is a radius of curvature of the image-side surface of the sixth lens.

7. The optical imaging lens group according to claim 1, wherein 1.42<CT1/(CT4+CT5)<2.

8. The optical imaging lens group according to claim 1, wherein 1<CT7/CT8<2,
where CT7 is a center thickness of the seventh lens along the optical axis, and CT8 is a center thickness of the eighth lens along the optical axis.

9. The optical imaging lens group according to claim 1, wherein −4<f456/f123<−1.5,
where f123 is a combined focal length of the first lens, the second lens and the third lens, and f456 is a combined focal length of the fourth lens, the fifth lens and the sixth lens.

10. The optical imaging lens group according to claim 1, wherein 2<ΣCT/ΣAT<2.5,
where ΣCT is a sum of center thicknesses of the first lens to the eighth lens along the optical axis, and ΣAT is a sum of spaced intervals along the optical axis between each two adjacent lenses of the first lens to the eighth lens.

11. An optical imaging lens group, comprising, sequentially from an object side to an image side along an optical axis, a first lens, a second lens, a third lens, a fourth lens, a fifth lens, a sixth lens, a seventh lens and an eighth lens, wherein,
the first lens has positive refractive power, a convex object-side surface and a concave image-side surface;
the second lens has negative refractive power and a concave image-side surface;
the third lens has positive refractive power and a convex object-side surface;
the fourth lens has refractive power;
the fifth lens has refractive power;
the sixth lens has refractive power, a convex object-side surface and a concave image-side surface;
the seventh lens has positive refractive power; and
the eighth lens has refractive power,
wherein −4<f456/f123<−1.5, where f123 is a combined focal length of the first lens, the second lens and the third lens, and f456 is a combined focal length of the fourth lens, the fifth lens and the sixth lens.

12. The optical imaging lens group according to claim 11, wherein 0.1<R1/R2<0.5,
where R1 is a radius of curvature of the object-side surface of the first lens, and R2 is a radius of curvature of the image-side surface of the first lens.

13. The optical imaging lens group according to claim 11, wherein −1.5<f2/f3<−0.5,
where f2 is an effective focal length of the second lens, and f3 is an effective focal length of the third lens.

14. The optical imaging lens group according to claim 11, wherein 1<R11/R12<1.5,
where R11 is a radius of curvature of the object-side surface of the sixth lens, and R12 is a radius of curvature of the image-side surface of the sixth lens.

15. The optical imaging lens group according to claim 11, wherein 1<TTL/R5<3,
where TTL is a distance along the optical axis from the object-side surface of the first lens to an imaging plane of the optical imaging lens group, and R5 is a radius of curvature of the object-side surface of the third lens.

16. The optical imaging lens group according to claim 11, wherein 1<f1/ImgH<2,
where f1 is an effective focal length of the first lens, and ImgH is half of a diagonal length of an effective pixel area on an imaging plane of the optical imaging lens group.

17. The optical imaging lens group according to claim 16, wherein f/EPD<1.4,
where f is a total effective focal length of the optical imaging lens group, and EPD is an entrance pupil diameter of the optical imaging lens group.

18. The optical imaging lens group according to claim 11, wherein 2<ΣCT/ΣAT<2.5,
   where ΣCT is a sum of center thicknesses of the first lens to the eighth lens along the optical axis, and ΣAT is a sum of spaced intervals along the optical axis between each two adjacent lenses of the first lens to the eighth lens.

19. The optical imaging lens group according to claim 18, wherein 1<CT1/(CT4+CT5)<2,
   where CT1 is a center thickness of the first lens along the optical axis, CT4 is a center thickness of the fourth lens along the optical axis, and CT5 is a center thickness of the fifth lens along the optical axis.

20. The optical imaging lens group according to claim 18, wherein 1<CT7/CT8<2,
   where CT7 is a center thickness of the seventh lens along the optical axis, and CT8 is a center thickness of the eighth lens along the optical axis.

* * * * *